United States Patent
Ziskind et al.

(10) Patent No.: US 8,964,977 B2
(45) Date of Patent: Feb. 24, 2015

(54) SYSTEMS AND METHODS FOR SAVING ENCODED MEDIA STREAMED USING ADAPTIVE BITRATE STREAMING

(75) Inventors: Ben Ziskind, San Marcos, CA (US); Song Cen, San Diego, CA (US); Tung Lin, San Diego, CA (US); Jason Braness, San Diego, CA (US); Kourosh Soroushian, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 0 days.

(21) Appl. No.: 13/436,922

(22) Filed: Mar. 31, 2012

(65) Prior Publication Data
US 2013/0058480 A1 Mar. 7, 2013

Related U.S. Application Data

(60) Provisional application No. 61/530,366, filed on Sep. 1, 2011.

(51) Int. Cl.
*H04N 7/26* (2006.01)
*H04N 7/167* (2011.01)
(Continued)

(52) U.S. Cl.
CPC ....... *H04N 19/00* (2013.01); *H04N 21/234309* (2013.01); *H04N 21/23439* (2013.01); *H04N 21/23608* (2013.01); *H04N 21/4344* (2013.01); *H04N 21/4621* (2013.01);
(Continued)

(58) Field of Classification Search
CPC ............... H04N 21/2347; H04N 21/23476; H04N 21/4405; H04N 7/50; H04N 7/26
USPC ............... 380/200, 210; 375/240.01, E7.026
See application file for complete search history.

(56) References Cited

U.S. PATENT DOCUMENTS 7,242,772 B1 * 7/2007 Tehranchi ............ 380/223
8,046,453 B2 * 10/2011 Olaiya ............ 709/224
(Continued)

FOREIGN PATENT DOCUMENTS

WO   WO 2011086190 A1 * 7/2011

OTHER PUBLICATIONS

Sheu et al. "Dynamic Layer Adjustments for SVC Segments in P2P Streaming Networks," Computer Symposium (ICS), 2010 International, Tainan, Taiwan, R.O.C., pp. 793-798.*

*Primary Examiner* — Michael Chao
*Assistant Examiner* — Shiuh-Huei Ku
(74) *Attorney, Agent, or Firm* — KPPB LLP

(57) ABSTRACT

Systems and methods for saving encoded media streamed using adaptive bitrate streaming in accordance with embodiments of the invention are disclosed. In one embodiment of the invention, a playback device configured to perform adaptive bitrate streaming of media includes a video decoder application and a processor, where the video decoder application configures the processor to select a download stream from a set of alternative streams of video data, measure streaming conditions and request a stream of video data from the alternative streams of video data, receive portions of video data from the requested stream of video data, decode the received video data, save the received video data to memory, when the received video data is from the download stream and separately download and save the corresponding portion of video data from the download stream to memory, when the received video data is not from the download stream.

33 Claims, 15 Drawing Sheets

(51) Int. Cl.
  *H04N 19/00*    (2014.01)
  *H04N 21/2343*   (2011.01)
  *H04N 21/236*    (2011.01)
  *H04N 21/434*    (2011.01)
  *H04N 21/462*    (2011.01)
  *H04N 21/6373*   (2011.01)
  *H04N 21/854*    (2011.01)
  *H04N 21/433*    (2011.01)
  *H04W 4/12*     (2009.01)
  *H04L 29/06*     (2006.01)
  *H04N 7/50*     (2006.01)
  *H04N 21/2347*   (2011.01)
  *H04N 21/4405*   (2011.01)

(52) U.S. Cl.
  CPC ....  *H04N 21/6373* (2013.01); *H04N 21/85406* (2013.01); *H04N 21/4331* (2013.01); *H04W 4/12* (2013.01); *H04L 65/604* (2013.01); *H04L 65/607* (2013.01); *H04L 65/4092* (2013.01)
  USPC .. 380/200; 380/210; 375/240.01; 375/E7.026

(56) References Cited

U.S. PATENT DOCUMENTS

| | | | | |
|---|---|---|---|---|
| 8,225,061 | B2 * | 7/2012 | Greenebaum | 711/163 |
| 8,286,621 | B2 * | 10/2012 | Halmone | 124/74 |
| 8,386,621 | B2 * | 2/2013 | Park et al. | 709/228 |
| 2006/0173887 | A1 * | 8/2006 | Breitfeld et al. | 707/101 |
| 2007/0292107 | A1 * | 12/2007 | Yahata et al. | 386/68 |
| 2008/0126248 | A1 * | 5/2008 | Lee et al. | 705/40 |
| 2008/0263354 | A1 * | 10/2008 | Beuque et al. | 713/158 |
| 2009/0293116 | A1 * | 11/2009 | DeMello et al. | 726/17 |
| 2010/0095121 | A1 * | 4/2010 | Shetty et al. | 713/170 |
| 2010/0228795 | A1 * | 9/2010 | Hahn et al. | 707/812 |
| 2012/0278496 | A1 * | 11/2012 | Hsu | 709/231 |
| 2013/0046902 | A1 * | 2/2013 | Villegas Nunez et al. | 709/231 |

* cited by examiner

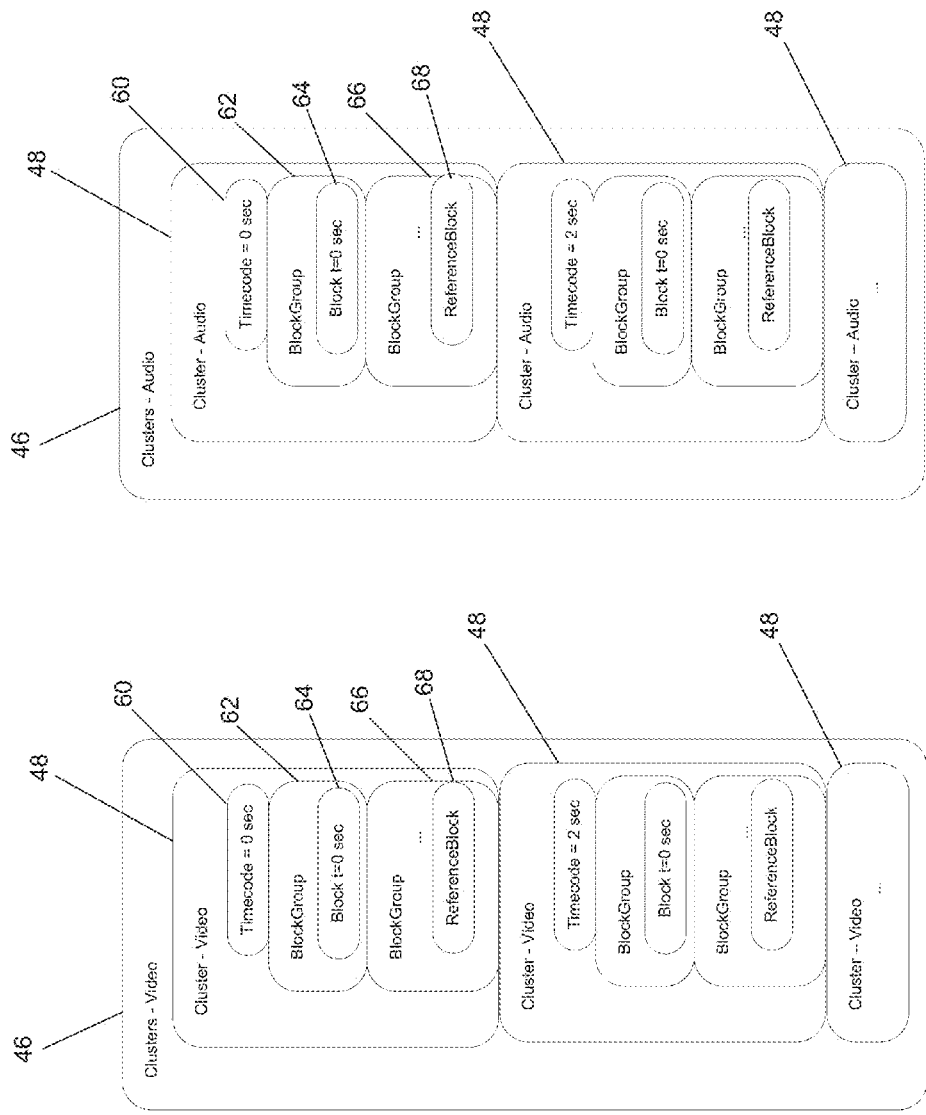

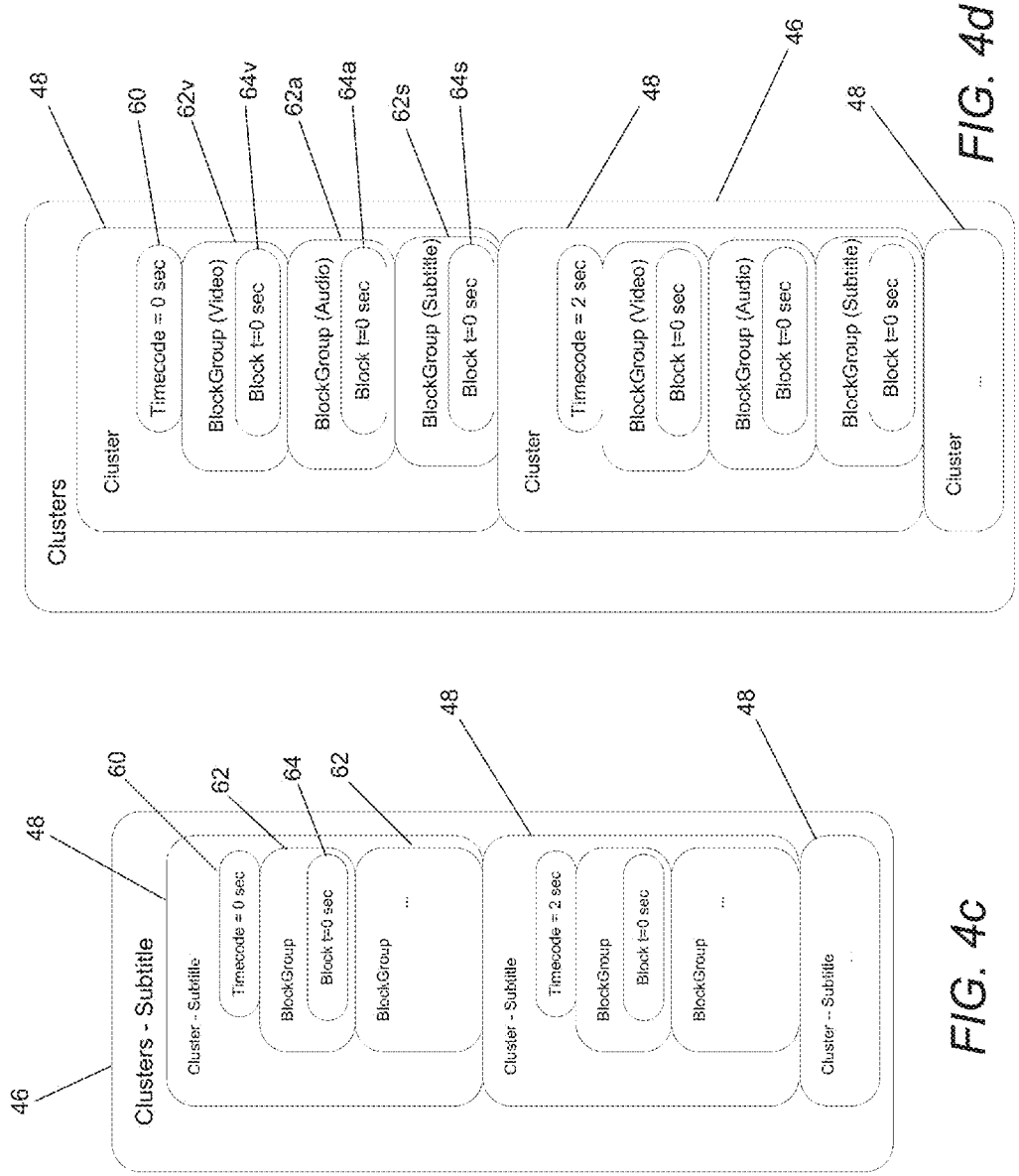

SYSTEMS AND METHODS FOR SAVING ENCODED MEDIA STREAMED USING ADAPTIVE BITRATE STREAMING

CROSS REFERENCE TO RELATED APPLICATIONS

This application claims priority to U.S. Provisional Application Ser. No. 61/530,366, entitled "Systems and Methods for Saving Encoded Media Streamed Using Adaptive Bitrate Streaming", filed Sep. 1, 2011, the entirety of which is incorporated herein by reference.

FIELD OF THE INVENTION

The present invention generally relates to adaptive streaming and more specifically to saving encoded media streamed using adaptive bitrate streaming.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, California utilizes an extension of the Matroska container format (i.e. is based upon the Matroska container format, but includes elements that are not specified within the Matroska format).

SUMMARY OF THE INVENTION

Systems and methods for saving encoded media streamed using adaptive bitrate streaming in accordance with embodiments of the invention are disclosed. In one embodiment of the invention, a playback device configured to perform adaptive bitrate streaming of media including a set of alternative streams of video data includes memory including a video decoder application and a processor, where the video decoder application configures the processor to select a download stream from a set of alternative streams of video data, where the alternative streams of video data are encoded at different maximum bitrates, measure streaming conditions and request a stream of video data from the alternative streams of video data based upon the measured streaming conditions, receive portions of video data from the requested stream of video data, decode the received video data, save the received video data to memory, when the received video data is from the download stream and separately download and save the corresponding portion of video data from the download stream to memory, when the received video data is not from the download stream.

In another embodiment of the invention, the video decoder application configures the processor to separately download and save the corresponding portion of video data from the download stream after streaming of video data from the alternative streams of video data has ceased.

In an additional embodiment of the invention, the video decoder application configures the processor to separately download and save the corresponding portion of video data from the download stream during the streaming of video data from the alternative streams of video data.

In an additional embodiment of the invention, the video decoder application configures the processor to select multiple download streams of video data from the set of alternative streams of video data.

In yet another additional embodiment of the invention, the media further includes a set of additional streams of data and where the video decoder application further configures the processor to select at least one additional download stream from the set of additional streams of data.

In still another additional embodiment of the invention, the video decoder application configures the processor to request a selected additional stream of data and to save the stream of data to memory.

In yet still another additional embodiment of the invention, the client application configures the processor to separately download data from a selected additional stream.

In yet another embodiment of the invention, the additional streams of data are from the group consisting of an alternative audio stream, a subtitle stream, a trick play stream, and an additional alternative video stream.

In still another embodiment of the invention, the video decoder application further configures the processor to multiplex the download stream into a container file.

In yet still another embodiment of the invention, the container file is in the Extensible Binary Meta Language file format.

In yet another additional embodiment of the invention, the container file is a Matroska container file.

In still another additional embodiment of the invention, the video decoder application further configures the processor to request header information and index information and generate header and index information for the container file using information including the requested header and index information.

In yet still another additional embodiment of the invention, the video data in the download stream is encrypted and the video decoder application further configures the processor to include cryptographic information in the header of the container file that enables playback of the encrypted video data.

In yet another embodiment of the invention, the cryptographic information is unique to the playback device.

In still another embodiment of the invention, the cryptographic information is unique to a specific user.

Still another embodiment of the invention includes an adaptive streaming system, including a media server, where the media server stores media including a set of alternative streams of video data and a playback device in communication with the media server, where the playback device is configured to request media from the media server, select a download stream from a set of alternative streams of video data, where the alternative streams of video data are encoded at different maximum bitrates, measure streaming conditions and request a stream of video data from the alternative streams of video data based upon the measured streaming conditions, receive portions of video data from the requested stream of video data, decode the received video data using a video decoder, save the received video data to memory, when the received video data is from the download stream, and separately download and save the corresponding portion of video data from the download stream to memory when the received video data is not from the download stream.

In yet another additional embodiment of the invention, the playback device is configured to separately download and save the corresponding portion of video data from the media server.

In still another additional embodiment of the invention, the playback device is configured to separately download and save the corresponding portion of video data from at least one peer playback device via a peer-to-peer network.

Still another embodiment of the invention includes performing adaptive bitrate streaming of media using a playback device, including selecting a download stream from a set of alternative streams of video data using a playback device, where the alternative streams of video data are encoded at different maximum bitrates, measuring streaming conditions and requesting a stream of video data from the alternative streams of video data based upon the measured streaming conditions using the playback device, receiving portions of video data from the requested stream of video data using the playback device, decoding the received video data using the playback device, saving the received video data to memory using the playback device, when the received video data is from the download stream, and separately downloading and saving the corresponding portion of video data from the download stream to memory using the playback device, when the received video data is not from the download stream.

In yet another additional embodiment of the invention, separately downloading and saving the corresponding portion of video data from the download stream occurs after streaming of video data from the alternative streams of video data has ceased.

In still another additional embodiment of the invention, separately downloading and saving the corresponding portion of video data from the download stream occurs during the streaming of video data from the alternative streams of video data.

In yet still another additional embodiment of the invention, selecting a download stream further comprises selecting multiple download streams of video data from the set of alternative streams of video data.

In yet another embodiment of the invention, the media further includes a set of additional streams of data and the method further comprises selecting at least one additional download stream from the set of additional streams of data using the playback device.

In still another embodiment of the invention, performing adaptive bitrate streaming further includes requesting a selected additional stream of data and saving the stream of data to memory.

In yet still another embodiment of the invention, performing adaptive bitrate streaming further includes separately downloading a selected additional stream.

In yet another additional embodiment of the invention, the additional streams of data are selected from the group consisting of alternative audio track data, subtitle data, trick play track data and alternative video data.

In still another additional embodiment of the invention, performing adaptive bitrate streaming further includes multiplexing the download stream into a container file using the playback device.

In yet still another additional embodiment of the invention, the container file is in the Extensible Binary Meta Language file format.

In yet another embodiment of the invention, the container file is a Matroska container.

In still another embodiment of the invention, performing adaptive bitrate streaming further includes requesting header information and index information using the playback device and generating header and index information for the container file based upon information including the requested header and index information using the playback device.

In yet still another embodiment of the invention, the video data in the download stream is encrypted and performing adaptive bitrate streaming further includes including cryptographic information in the header of the container file using the playback device, where the cryptographic information enables playback of the encrypted video data.

In yet another additional embodiment of the invention, the cryptographic information is unique to the playback device.

In still another additional embodiment of the invention, the cryptographic information is unique to a specific user.

Still another embodiment of the invention includes a machine readable medium containing processor instructions, where execution of the instructions by a processor causes the processor to perform a process including selecting a download stream from a set of alternative streams of video data, where the alternative streams of video data are encoded at different maximum bitrates, measuring streaming conditions and requesting a stream of video data from the alternative streams of video data based upon the measured streaming conditions, receiving portions of video data from the requested stream of video data, decoding the received video data, saving the received video data to memory, when the received video data is from the download stream, and separately downloading and saving the corresponding portion of video data from the download stream to memory when the received video data is not from the download stream.

BRIEF DESCRIPTION OF THE DRAWINGS

FIGS. 4a-4c conceptually illustrate the insertion of different types of media into the Clusters element of a Matroska container file subject to various constrains that facilitate adaptive bitrate streaming in accordance with embodiments of the invention.

FIG. 4d conceptually illustrates the multiplexing of different types of media into the Clusters element of a Matroska container file subject to various constraints that facilitate adaptive bitrate streaming in accordance with an embodiment of the invention.

DETAILED DESCRIPTION

Figure 1:
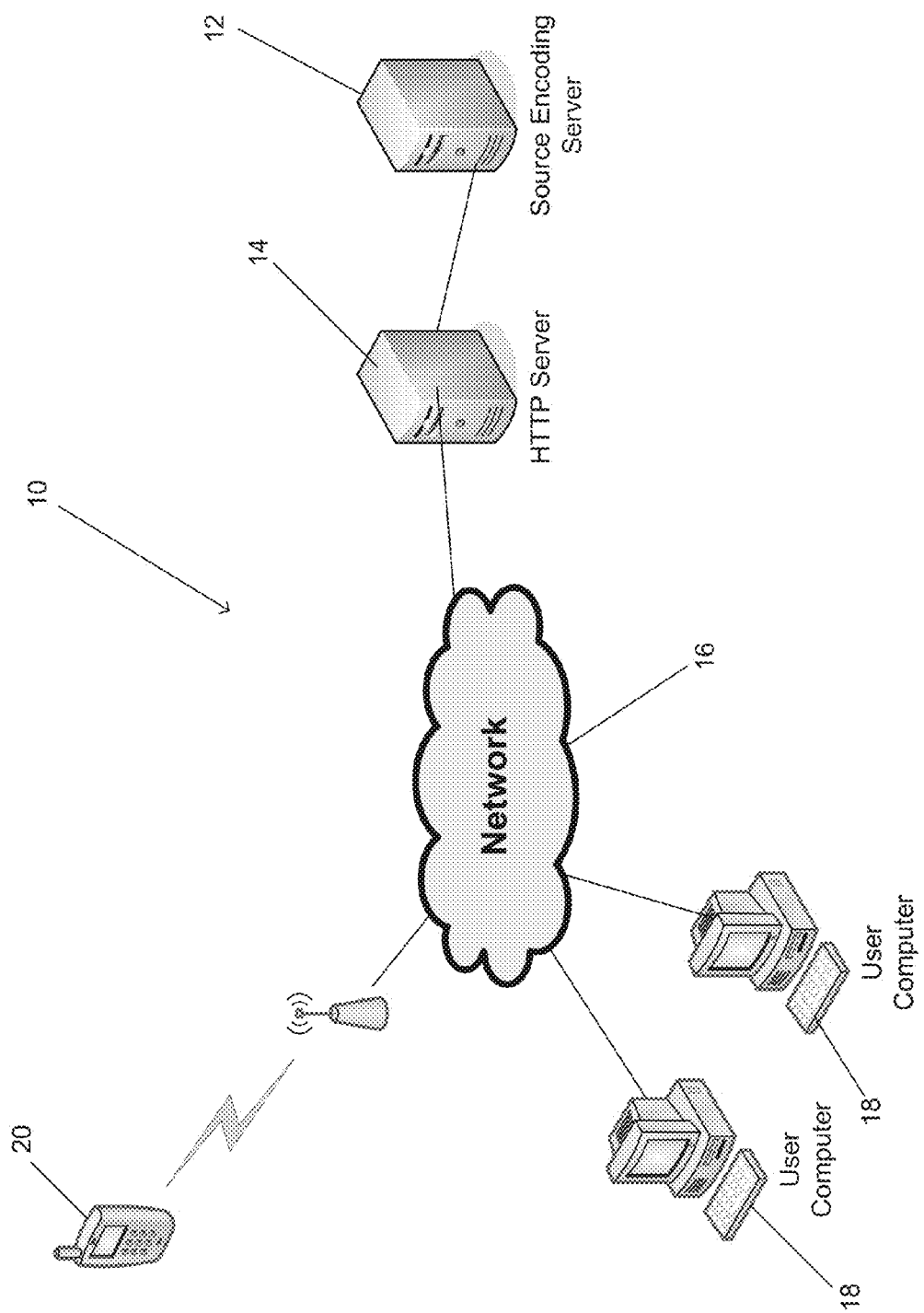
FIG. 1 is a network diagram of an adaptive bitrate streaming system in accordance with an embodiment of the invention.

Turning now to the drawings, systems and methods for saving encoded media streamed using adaptive bitrate streaming in accordance with embodiments of the invention are illustrated. In a number of embodiments, source media is encoded as a number of alternative streams. Each stream is stored in a container file and a playback device requests portions of the alternative streams as part of the process of adaptively streaming the encoded media. The portions of media selected from each of the container files typically depends upon the streaming conditions experienced by the playback device. In a number of embodiments, the playback device can download one or more of the streams to create a local copy of the media. When the network conditions permit streaming of portions of the streams that the playback device desires to download (typically the highest bitrate streams), the playback device can save the downloaded portions of the stream. Upon completion of the streaming session, the playback device can request any remaining portions of the streams selected for download. In this way, the playback device is able to commence downloading portions of the downloaded streams as the encoded media is being adaptively streamed. In a number of embodiments, the additional portions of the container file are downloaded via a peer-to-peer network to reduce the demands on the servers used to stream the encoded media. In several embodiments, one or more audio and subtitle streams accompanying the video stream are downloaded. When the entire video stream at the desired bitrate is downloaded, the playback device can multiplex the audio and video streams to form a single multimedia file. In many embodiments, the playback device also retrieves additional content such as alternative video streams and alternative audio or subtitle streams asynchronously from the streamed media. In this way, the additional content can be incorporated in the multimedia file saved by the playback device.

In many embodiments, the Matroska container file is a specialized Matroska container file in that the manner in which the media in each stream is encoded and stored within the container is constrained to improve streaming performance. In several embodiments, the Matroska container file is further specialized in that additional index elements (i.e. elements that are not specified as part of the Matroska container format) can be included within the file to facilitate the retrieval of desired media during adaptive bitrate streaming. In several embodiments, each stream (i.e. audio, video, or subtitle) is stored within a separate Matroska container file. In other embodiments, an encoded video stream is multiplexed with one or more encoded audio, and/or subtitle streams in each Matroska container file. A top level index file containing an index to the streams contained within each of the container files is also generated to enable adaptive bitrate streaming of the encoded media. In many embodiments, the top level index file is a Synchronized Multimedia Integration Language (SMIL) file containing URIs for each of the Matroska container files. In other embodiments, any of a variety of file formats can be utilized in the generation of the top level index file.

The performance of an adaptive bitrate streaming system in accordance with embodiments of the invention can be significantly enhanced by encoding each portion of the source video at each bit rate in such a way that the portion of video is encoded in each stream as a single (or at least one) closed group of pictures (GOP) starting with an Instantaneous Decoder Refresh (IDR) frame. The GOP for each stream can then be stored as a Cluster element within the Matroska container file for the stream. In this way, the playback device can switch between streams at the completion of the playback of a Cluster and, irrespective of the stream from which a Cluster is obtained the first frame in the Cluster will be an IDR frame and can be decoded without reference to any encoded media other than the encoded media contained within the Cluster element. In many embodiments, the sections of the source video that are encoded as GOPs are all the same duration. In a number of embodiments each two second sequence of the source video is encoded as a GOP.

Retrieval of media using HTTP during adaptive streaming can be improved by adding additional index information to the Matroska container files used to contain each of the encoded streams. In a number of embodiments, the index is a reduced index in that the index only points to the IDRs at the start of each cluster. In many embodiments, the index of the Matroska container file includes additional non-standard attributes (i.e. attributes that do not form part of the Matroska container file format specification) that specify the size of each of the clusters so that a playback device can retrieve a Cluster element from the Matroska container file via HTTP using a byte range request.

Adaptive streaming of source media encoded in the manner outlined above can be coordinated by a playback device in accordance with embodiments of the invention. The playback device obtains information concerning each of the available streams from the top level index file and selects one or more streams to utilize in the playback of the media. The playback device can then obtain header information from the Matroska container files containing the one or more bitstreams or streams, and the headers provide information concerning the decoding of the streams. The playback device can also request index information that indexes the encoded media stored within the relevant Matroska container files. The index information can be stored within the Matroska container files or separately from the Matroska container files in the top level index or in separate index files. The index information enables the playback device to request byte ranges corresponding to Cluster elements within the Matroska container file containing specific portions of encoded media via HTTP from the server. As the playback device receives the Cluster elements from the HTTP server, the playback device can evaluate current streaming conditions to determine whether to increase or decrease the bitrate of the streamed media. In the event that the playback device determines that a change in bitrate is necessary, the playback device can obtain header information and index information for the container file(s) containing the desired stream(s) (assuming the playback device has not already obtained this information). The index information can then be used to identify the byte range of the Cluster element containing the next portion of the source media encoded at the desired bit rate and the identified Cluster element can be retrieved from the server via HTTP. The next portion of the source media that is requested is typically identified based upon the Cluster elements already requested by the playback device and the Cluster elements buffered by the playback device. The next portion of source media requested from the alternative stream is requested to minimize the likelihood that the buffer of the playback device will underflow (i.e. run out media to playback) prior to receipt of the Cluster element containing the next portion of source media by the playback device. In this way, the playback device can achieve adaptive bitrate streaming by retrieving sequential Cluster elements from the various streams as appropriate to the streaming conditions using the top level index and index information describing the Cluster elements within each of the Matroska container files.

In a number of embodiments, variation in the bitrate between different streams can be achieved by modifying the encoding parameters for each stream including but not limited to the bitrate, frame rate, and resolution. When different streams include different resolutions, the display aspect ratio of each stream is the same and the sample aspect ratios are modified to ensure smooth transitions from one resolution to another. The encoding of source video for use in adaptive bitrate streaming and the playback of the encoded source video using HTTP requests to achieve adaptive bitrate streaming in accordance with embodiments of the invention is discussed further below.

Adaptive Streaming System Architecture

An adaptive streaming system in accordance with an embodiment of the invention is illustrated in FIG. 1. The adaptive streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). As is discussed further below, the source encoding server 12 generates a top level index to a plurality of container files containing the streams, at least a plurality of which are alternative streams. Alternative streams are streams that encode the same media content in different ways. In many instances, alternative streams encode media content (such as but not limited to video) at different bitrates. In a number of embodiments, the alternative streams are encoded with different resolutions and/or at different frame rates. The top level index file and the container files are uploaded to an HTTP server 14. A variety of playback devices can then use HTTP or another appropriate stateless protocol to request portions of the top level index file and the container files via a network 16 such as the Internet.

In many embodiments, the top level index file is a SMIL file and the media is stored in Matroska container files. As is discussed further below, the media can be stored within the Matroska container file in a way that facilitates the adaptive bitrate streaming of the media. In many embodiments, the Matroska container files are specialized Matroska container files that include enhancements (i.e. elements that do not form part of the Matroska file format specification) that facilitate the retrieval of specific portions of media via HTTP during the adaptive bitrate streaming of the media.

Figure 11:
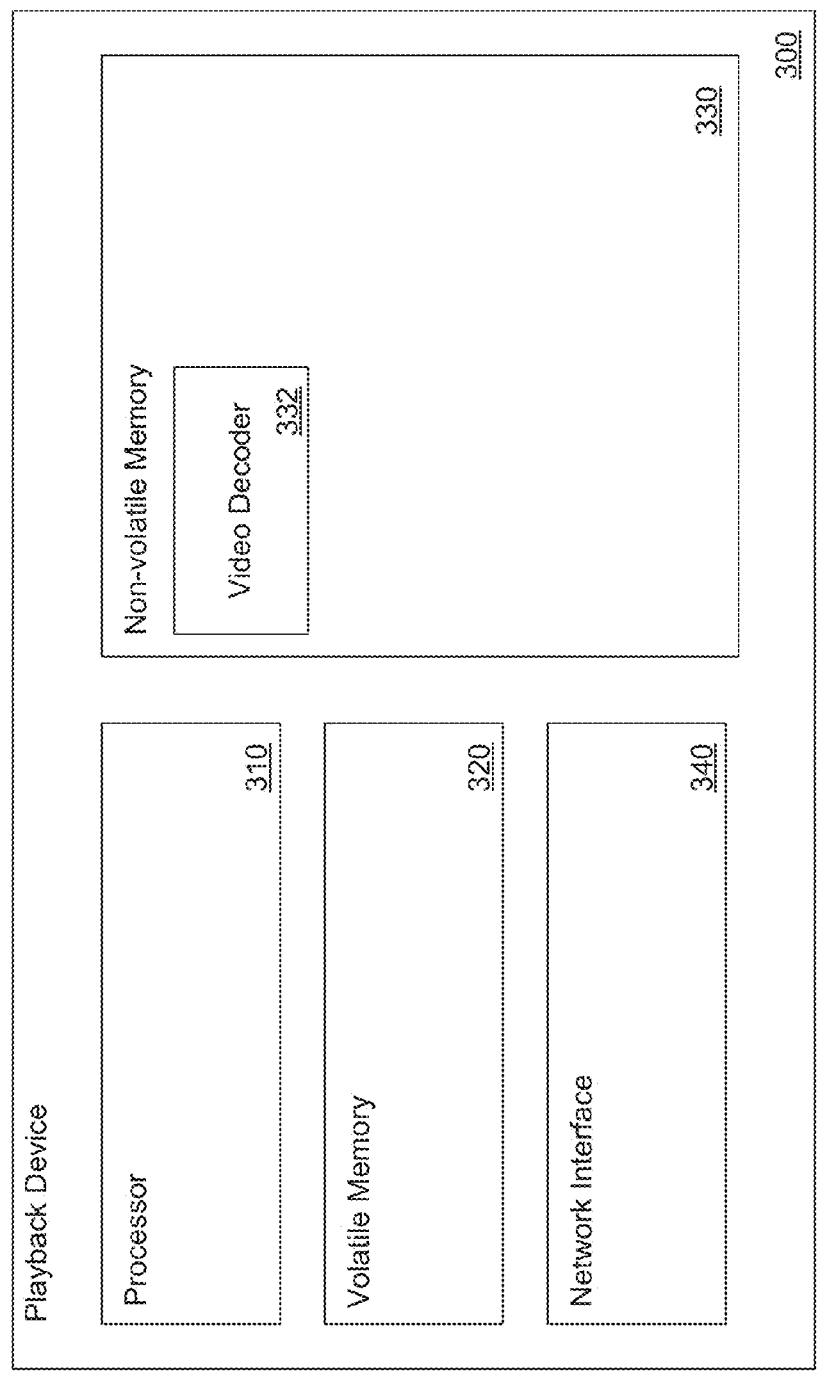
FIG. 11 conceptually illustrates a playback device configured to perform adaptive bitrate streaming in accordance with an embodiment of the invention.

In the illustrated embodiment, playback devices include personal computers 18 and mobile phones 20. In many embodiments of the invention, playback devices can include consumer electronics devices such as DVD players, Blu-ray players, televisions, set top boxes, video game consoles, tablets, and other devices that are capable of connecting to a server and playing back encoded media. The basic architecture of a playback device in accordance with an embodiment of the invention is illustrated in FIG. 11. The playback device 300 includes a processor 310 in communication with non-volatile memory 330 and volatile memory 320. In the illustrated embodiment, the non-volatile memory includes a video decoder 332 that configures the processor to decode video data. In several embodiments, the video decoder 332 is implemented using the processor 310. The network client 300 also includes a network interface 340 configured to send and receive data over a network connection. In a number of embodiments, the network interface 340 is in communication with the processor 310, the non-volatile memory 330, and the volatile memory 320. Although a specific playback device architecture is illustrated in FIG. 11, any of a variety of architectures including architectures where the video decoder is located on disk or some other form of storage and is loaded into volatile memory at runtime can be utilized to implement playback devices in accordance with embodiments of the invention.

Although a specific architecture is shown in FIG. 1 any of a variety of architectures can be utilized that enable playback devices to request portions of the top level index file and the container files in accordance with embodiments of the invention. Systems and methods for adaptive streaming systems in accordance with embodiments of the invention are discussed below.

File Structure

Figure 2:
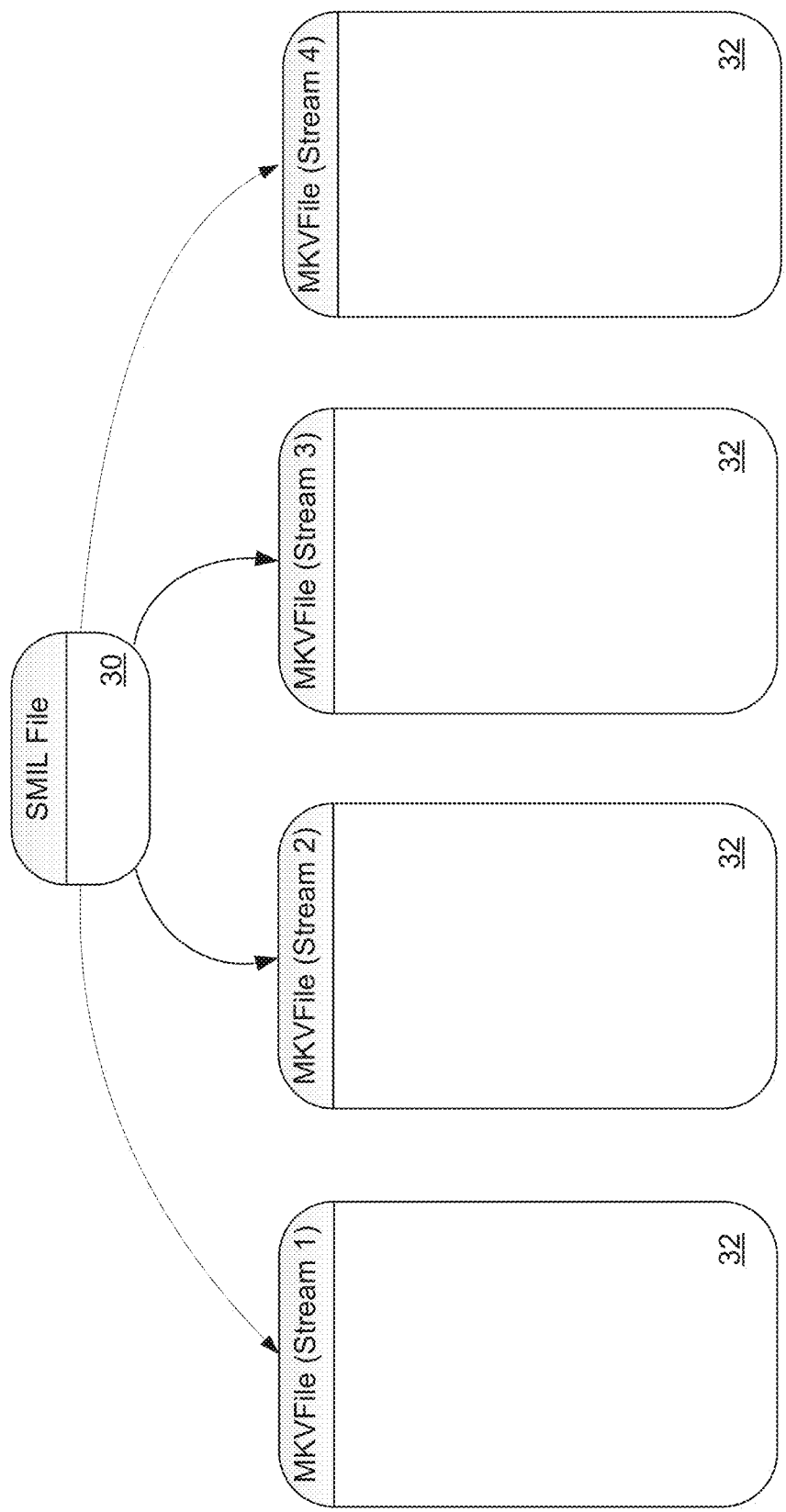
FIG. 2 conceptually illustrates a top level index file and Matroska container files generated by the encoding of source media in accordance with embodiments of the invention.

Files generated by a source encoder and/or stored on an HTTP server for streaming to playback devices in accordance with embodiments of the invention are illustrated in FIG. 2. The files utilized in the adaptive bitrate streaming of the source media include a top level index 30 and a plurality of container files 32 that each contains at least one stream. The top level index file describes the content of each of the container files. As is discussed further below, the top level index file can take a variety of forms including an SMIL file and the container files can take a variety of forms including a specialized Matroska container file.

In many embodiments, each Matroska container file contains a single stream. For example, the stream could be one of a number of alternate video streams, an audio stream, one of a number of alternate audio streams, a subtitle stream, one of a number of alternate subtitle streams, a trick play stream, or one of a number of alternate trick play streams. In several embodiments, the Matroska container file includes multiple multiplexed streams. For example, the Matroska container could include a video stream, and one or more audio streams, one or more subtitle streams, and/or one or more trick play streams. As is discussed further below, in many embodiments the Matroska container files are specialized files. The encoding of the media and the manner in which the media is stored within Cluster elements within the Matroska container file can be subject to constraints designed to enhance the performance of an adaptive bitrate streaming system. In addition, the Matroska container file can include index elements that facilitate the location and downloading of Cluster elements from the various Matroska container files during the adaptive streaming of the media. Top level index files and Matroska container files that can be used in adaptive bitrate streaming systems in accordance with embodiments of the invention are discussed below.

Top Level Index Files

Playback devices in accordance with many embodiments of the invention utilize a top level index file to identify the container files that contain the streams available to the playback device for use in adaptive bitrate streaming. In many embodiments, the top level index files can include references to container files that each includes an alternative stream of encoded media. The playback device can utilize the information in the top level index file to retrieve encoded media from each of the container files according to the streaming conditions experienced by the playback device.

In several embodiments, the top level index file provides information enabling the playback device to retrieve information concerning the encoding of the media in each of the container files and an index to encoded media within each of the container files. In a number of embodiments, each container file includes information concerning the encoded media contained within the container file and an index to the encoded media within the container file and the top level index file indicates the portions of each container file containing this information. Therefore, a playback device can retrieve the top level index file and use the top level index file to request the portions of one or more of the container files that include information concerning the encoded media contained within the container file and an index to the encoded media within the container file. A variety of top level index files that can be utilized in adaptive bitrate streaming systems in accordance with embodiments of the invention are discussed further below.

Top Level Index SMIL Files

In a number of embodiments, the top level index file utilized in the adaptive bitrate streaming of media is a SMIL file, which is an XML file that includes a list of URIs describing each of the streams and the container files that contain the streams. The URI can include information such as the "system-bitrate" of the stream contained within the stream and information concerning the location of specific pieces of data within the container file.

The basic structure of a SMIL file involves providing an XML declaration and a SMIL element. The SMIL element defines the streams available for use in adaptive bitrate streaming and includes a HEAD element, which is typically left empty and a BODY element that typically only contains a PAR (parallel) element. The PAR element describes streams that can be played simultaneously (i.e. include media that can be presented at the same time).

The SMIL specification defines a number of child elements to the PAR element that can be utilized to specify the streams available for use in adaptive bitrate streaming. The VIDEO, AUDIO and TEXTSTREAM elements can be utilized to define a specific video, audio or subtitle stream. The VIDEO, AUDIO and TEXTSTREAM elements can collectively be referred to as media objects. The basic attributes of a media object are the SRC attribute, which specifies the full path or a URI to a container file containing the relevant stream, and the XML:LANG attribute, which includes a 3 letter language code. Additional information concerning a media object can be specified using the PARAM element. The PARAM element is a standard way within the SMIL format for providing a general name value pair. In a number of embodiments of the invention, specific PARAM elements are defined that are utilized during adaptive bitrate streaming.

In many embodiments, a "header-request" PARAM element is defined that specifies the size of the header section of the container file containing the stream. The value of the "header-request" PARAM element typically specifies the number of bytes between the start of the file and the start of the encoded media within the file. In many embodiments, the header contains information concerning the manner in which the media is encoded and a playback device retrieves the header prior to playback of the encoded media in order to be able to configure the decoder for playback of the encoded media. An example of a "header-request" PARAM element is follows:

```
<param
    name="header-request"
    value="1026"
    valuetype="data" />
```

In a number of embodiments, a "mime" PARAM element is defined that specifies the MIME type of the stream. A "mime" PARAM element that identifies the stream as being an H.264 stream (i.e. a stream encoded in accordance with the MPEG-4 Advanced Video Codec standard) is as follows:

```
<param
    name="mime"
    value="V_MPEG4/ISO/AVC"
    valuetype="data" />
```

The MIME type of the stream can be specified using a "mime" PARAM element as appropriate to the encoding of a specific stream (e.g. AAC audio or UTF-8 text stream).

When the media object is a VIDEO element, additional attributes are defined within the SMIL file format specification including the systemBitrate attribute, which specifies the bitrate of the stream in the container file identified by the VIDEO element, and width and height attributes, which specify the dimensions of the encoded video in pixels. Additional attributes can also be defined using the PARAM element. In several embodiments, a "vbv" PARAM element is defined that specified the VBV buffer size of the video stream in bytes. The video buffering verifier (VBV) is a theoretical MPEG video buffer model used to ensure that an encoded video stream can be correctly buffered and played back at the decoder device. An example of a "vbv" PARAM element that specifies a VBV size of 1000 bytes is as follows:

```
<param
    name="vbv"
    value="1000"
    valuetype="data" />
```

An example of VIDEO element including the attributes discussed above is as follows:

```
<video
    src="http://cnd.com/video1_620kbps.mkv"
    systemBitrate="620"
    width="480"
    height="270" >
    <param
        name="vbv"
        value="1000"
        valuetype="data" />
</video>
```

Adaptive bitrate streaming systems in accordance with embodiments of the invention can support trick play streams, which can be used to provide smooth visual search through source content encoded for adaptive bitrate streaming. A trick play stream can be encoded that appears to be an accelerated visual search through the source media when played back, when in reality the trick play stream is simply a separate track encoding the source media at a lower frame rate. In many embodiments of the system a VIDEO element that references a trick play track is indicated by the systemProfile attribute of the VIDEO element. In other embodiments, any of a variety of techniques can be utilized to signify within the top level index file that a specific stream is a trick play stream. An example of a trick play stream VIDEO element in accordance with an embodiment of the invention is as follows:

```
<video
    src="http://cnd.com/video_test2_600kbps.mkv"
    systemProfile="DivXPlusTrickTrack"
    width="480"
    height="240">
    <param name="vbv" value="1000" valuetype="data" />
    <param name="header-request" value="1000" valuetype="data" />
</video>
```

In a number of embodiments of the invention, a "reservedBandwidth" PARAM element can be defined for an AUDIO element. The "reservedBandwidth" PARAM element specifies the bitrate of the audio stream in Kbps. An example of an AUDIO element specified in accordance with an embodiment of the invention is as follows:

```
<audio
    src="http://cnd.com/audio_test1_277kbps.mkv"
    xml:lang="gem"
    <param
        name="reservedBandwidth"
        value="128"
        valuetype="data" />
/>
```

In several embodiments, the "reservedBandwidth" PARAM element is also defined for a TEXTSTREAM element. An example of a TEXTSTREAM element including a "reservedBandwidth" PARAM element in accordance with an embodiment of the invention is as follows:

```
<textstream
    src="http://cnd.com/text_stream_ger.mkv"
    xml:lang="gem"
    <param
        name="reservedBandwidth"
        value="32"
        valuetype="data" />
/>
```

In other embodiments, any of a variety of mechanisms can be utilized to specify information concerning VIDEO, AUDIO, and SUBTITLE elements as appropriate to specific applications.

A SWITCH element is a mechanism defined within the SMIL file format specification that can be utilized to define adaptive or alternative streams. An example of the manner in which a SWITCH element can be utilized to specify alternative video streams at different bitrates is as follows:

```
<switch>
    <video src="http://cnd.com/video_test1_300kbps.mkv"/>
    <video src="http://cnd.com/video_test2_900kbps.mkv"/>
    <video src="http://cnd.com/video_test3_1200kbps.mkv"/>
</switch>
```

The SWTICH element specifies the URLs of three alternative video streams. The file names indicate that the different bitrates of each of the streams. As is discussed further below, the SMIL file format specification provides mechanisms that can be utilized in accordance with embodiments of the invention to specify within the top level index SMIL file additional information concerning a stream and the container file in which it is contained.

In many embodiments of the invention, the EXCL (exclusive) element is used to define alternative tracks that do not adapt during playback with streaming conditions. For example, the EXCL element can be used to define alternative audio tracks or alternative subtitle tracks. An example of the manner in which an EXCL element can be utilized to specify alternative English and French audio streams is as follows:

```
<excl>
    <audio
        src="http://cnd.com/english-audio.mkv"
        xml:lang="eng"/>
    <audio
        src="http://cnd.com/french-audio.mkv"
        xml:lang="fre"/>
</excl>
```

An example of a top level index SMIL file that defines the attributes and parameters of two alternative video levels, an audio stream and a subtitle stream in accordance with an embodiment of the invention is as follows:

```
<?xml version="1.0" encoding="utf-8"?>
<smil xmlns="http://www.w3.org/ns/SMIL" version="3.0" baseProfile="Language">
    <head>
    </head>
    <body>
        <par>
            <switch>
                <video
                    src="http://cnd.com/video_test1_300kbps.mkv"
                    systemBitrate="300"
                    vbv="600"
                    width="320"
                    height="240" >
                    <param
                        name="vbv"
                        value="600"
                        valuetype="data" />
                    <param
                        name="header-request"
                        value="1000"
                        valuetype="data" />
                </video>
                <video
                    src="http://cnd.com/video_test2_600kbps.mkv"
                    systemBitrate="600"
                    vbv ="900"
                    width="640"
                    height="480">
                    <param
                        name="vbv"
                        value="1000"
                        valuetype="data" />
                    <param
                        name="header-request"
                        value="1000"
                        valuetype="data" />
                </video>
            </switch>
            <audio
                src="http://cnd.com/audio.mkv"
                xml:lang="eng">
                <param
                    name="header-request"
                    value="1000"
                    valuetype="data" />
                <param name="reservedBandwidth" value="128" valuetype="data" />
            </audio>
            <textstream
                src="http://cnd.com/subtitles.mkv"
                xml:lang="eng">
                <param
                    name="header-request"
                    value="1000"
                    valuetype="data" />
                <param name="reservedBandwidth" value="32" valuetype="data" />
            </textstream>
        </par>
    </body>
</smil>
```

The top level index SMIL file can be generated when the source media is encoded for playback via adaptive bitrate streaming. Alternatively, the top level index SMIL file can be generated when a playback device requests the commencement of playback of the encoded media. When the playback device receives the top level index SMIL file, the playback device can parse the SMIL file to identify the available streams. The playback device can then select the streams to utilize to playback the content and can use the SMIL file to identify the portions of the container file to download to obtain information concerning the encoding of a specific stream and/or to obtain an index to the encoded media within the container file.

Although top level index SMIL files are described above, any of a variety of top level index file formats can be utilized to create top level index files as appropriate to a specific application in accordance with an embodiment of the invention. The use of top level index files to enable playback of encoded media using adaptive bitrate streaming in accordance with embodiments of the invention is discussed further below.

Storing Media in Matroska Files for Adaptive Bitrate Streaming

Figure 3:
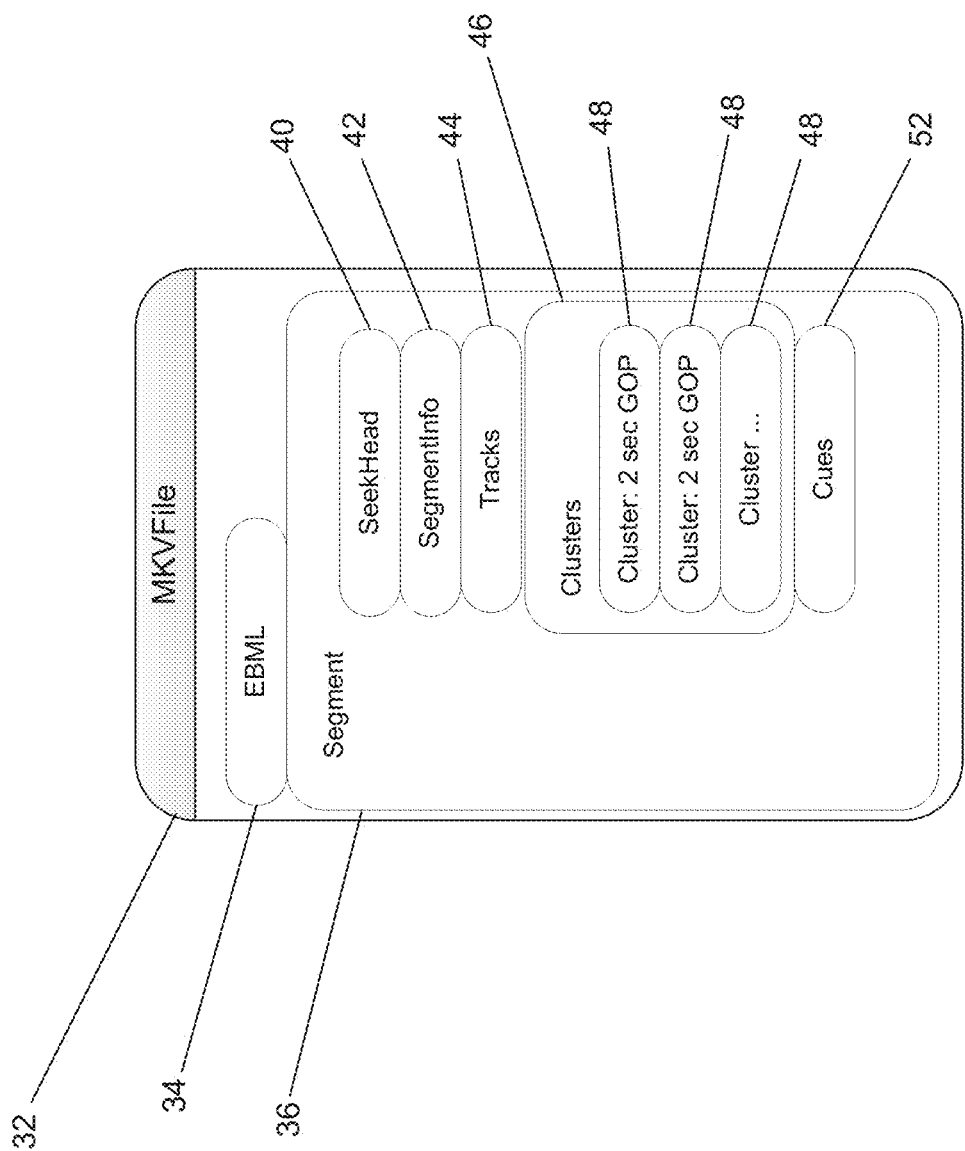
FIG. 3 conceptually illustrates a specialized Matroska container file incorporating a modified Cues element in accordance with an embodiment of the invention.

A Matroska container file used to store encoded video in accordance with an embodiment of the invention is illustrated in FIG. 3. The container file 32 is an Extensible Binary Markup Language (EBML) file that is an extension of the Matroska container file format. The specialized Matroska container file 32 includes a standard EBML element 34, and a standard Segment element 36 that includes a standard Seek Head element 40, a standard Segment Information element 42, and a standard Tracks element 44. These standard elements describe the media contained within the Matroska container file. The Segment element 36 also includes a standard Clusters element 46. As is described below, the manner in which encoded media is inserted within individual Cluster elements 48 within the Clusters element 46 is constrained to improve the playback of the media in an adaptive streaming system. In many embodiments, the constraints imposed upon the encoded video are consistent with the specification of the Matroska container file format and involve encoding the video so that each cluster includes at least one closed GOP commencing with an IDR frame. In addition to the above standard elements, the Segment element 36 also includes a modified version of the standard Cues element 52. As is discussed further below, the Cues element includes specialized CuePoint elements (i.e. non-standard CuePoint elements) that facilitate the retrieval of the media contained within specific Cluster elements via HTTP.

The constraints imposed upon the encoding of media and the formatting of the encoded media within the Clusters element of a Matroska container file for adaptive bitrate streaming and the additional index information inserted within the container file in accordance with embodiments of the invention is discussed further below.

Encoding Media for Insertion in Cluster Elements

An adaptive bitrate streaming system provides a playback device with the option of selecting between different streams of encoded media during playback according to the streaming conditions experienced by the playback device. In many embodiments, switching between streams is facilitated by separately pre-encoding discrete portions of the source media in accordance with the encoding parameters of each stream and then including each separately encoded portion in its own Cluster element within the stream's container file. Furthermore, the media contained within each cluster is encoded so that the media is capable of playback without reference to media contained in any other cluster within the stream. In this way, each stream includes a Cluster element corresponding to the same discrete portion of the source media and, at any time, the playback device can select the Cluster element from the stream that is most appropriate to the streaming conditions experienced by the playback device and can commence playback of the media contained within the Cluster element. Accordingly, the playback device can select clusters from different streams as the streaming conditions experienced by the playback device change over time. In several embodiments, the Cluster elements are further constrained so that each Cluster element contains a portion of encoded media from the source media having the same duration. In a number of embodiments, each Cluster element includes two seconds of encoded media. The specific constraints applied to the media encoded within each Cluster element depending upon the type of media (i.e. video, audio, or subtitles) are discussed below.

A Clusters element of a Matroska container file containing a video stream in accordance with an embodiment of the invention is illustrated in FIG. 4a. The Clusters element 46 includes a plurality of Cluster elements 48 that each contains a discrete portion of encoded video. In the illustrated embodiment, each Cluster element 48 includes two seconds of encoded video. In other embodiments, the Cluster elements include encoded video having a greater or lesser duration than two seconds. The smaller the Cluster elements (i.e. the smaller the duration of the encoded media within each Cluster element), the higher the overhead associated with requesting each Cluster element. Therefore, a tradeoff exists between the responsiveness of the playback device to changes in streaming conditions and the effective data rate of the adaptive streaming system for a given set of streaming conditions (i.e. the portion of the available bandwidth actually utilized to transmit encoded media). In several embodiments, the encoded video sequences in the Cluster elements have different durations. Each Cluster element 48 includes a Timecode element 60 indicating the start time of the encoded video within the Cluster element and a plurality of BlockGroup elements. As noted above, the encoded video stored within the Cluster is constrained so that the encoded video can be played back without reference to the encoded video contained within any of the other Cluster elements in the container file. In many embodiments, encoding the video contained within the Cluster element as a GOP in which the first frame is an IDR frame enforces the constraint. In the illustrated embodiment, the first BlockGroup element 62 contains an IDR frame. Therefore, the first BlockGroup element 62 does not include a ReferenceBlock element. The first BlockGroup element 62 includes a Block element 64, which specifies the Timecode attribute of the frame encoded within the Block element 64 relative to the Timecode of the Cluster element 48. Subsequent BlockGroup elements 66 are not restricted in the types of frames that they can contain (other than that they cannot reference frames that are not contained within the Cluster element). Therefore, subsequent BlockGroup elements 66 can include ReferenceBlock elements 68 referencing other BlockGroup element(s) utilized in the decoding of the frame contained within the BlockGroup or can contain IDR frames and are similar to the first BlockGroup element 62. As noted above, the manner in which encoded video is inserted within the Cluster elements of the Matroska file conforms with the specification of the Matroska file format.

The insertion of encoded audio and subtitle information within a Clusters element 46 of a Matroska container file in accordance with embodiments of the invention is illustrated in FIGS. 4b and 4c. In the illustrated embodiments, the encoded media is inserted within the Cluster elements 48 subject to the same constraints applied to the encoded video discussed above with respect to FIG. 4*a*. In addition, the duration of the encoded audio and subtitle information within each Cluster element corresponds to the duration of the encoded video in the corresponding Cluster element of the Matroska container file containing the encoded video. In other embodiments, the Cluster elements within the container files containing the audio and/or subtitle streams need not correspond with the start time and duration of the Cluster elements in the container files containing the alternative video streams.

Multiplexing Streams in a Single MKV Container File

The Clusters elements shown in FIGS. 4*a*-4*c* assume that a single stream is contained within each Matroska container file. In several embodiments, media from multiple streams is multiplexed within a single Matroska container file. In this way, a single container file can contain a video stream multiplexed with one or more corresponding audio streams, and/or one or more corresponding subtitle streams. Storing the streams in this way can result in duplication of the audio and subtitle streams across multiple alternative video streams. However, the seek time to retrieve encoded media from a video stream and an associated audio, and/or subtitle stream can be reduced due to the adjacent storage of the data on the server. The Clusters element 46 of a Matroska container file containing multiplexed video, audio and subtitle data in accordance with an embodiment of the invention is illustrated in FIG. 4*d*. In the illustrated embodiment, each Cluster element 48 includes additional BlockGroup elements for each of the multiplexed streams. The first Cluster element includes a first BlockGroup element 62*v* for encoded video that includes a Block element 64*v* containing an encoded video frame and indicating the Timecode attribute of the frame relative to the start time of the Cluster element (i.e. the Timecode attribute 60). A second BlockGroup element 62*a* includes a Block element 64*a* including an encoded audio sequence and indicating the timecode of the encoded audio relative to the start time of the Cluster element, and a third BlockGroup element 62*s* including a Block element 64*s* containing an encoded subtitle and indicating the timecode of the encoded subtitle relative to the start time of the Cluster element. Although not shown in the illustrated embodiment, each Cluster element 48 likely would include additional BlockGroup elements containing additional encoded video, audio or subtitles. Despite the multiplexing of the encoded video, audio, and/or subtitle streams, the same constraints concerning the encoded media apply.

Incorporating Trick Play Tracks in MKV Container Files for Use in Adaptive Bitrate Streaming Systems The incorporation of trick play tracks within Matroska container files is proposed by DivX, LLC in U.S. patent application Ser. No. 12/260,404, entitled "Application Enhancement Tracks", filed Oct. 29, 2008, the disclosure of which is hereby incorporated by reference in its entirety. Trick play tracks similar to the trick play tracks described in U.S. patent application Ser. No. 12/260,404 can be used to provide a trick play stream in an adaptive bitrate streaming system in accordance with an embodiment of the invention to provide smooth visual search through source content encoded for adaptive bitrate streaming. A separate trick play track can be encoded that appears to be an accelerated visual search through the source media when played back, when in reality the trick play track is simply a separate track encoding the source media at a lower frame rate. In several embodiments, the tick play stream is created by generating a trick play track in the manner outlined in U.S. patent application Ser. No. 12/260,404 and inserting the trick play track into a Matroska container file subject to the constraints mentioned above with respect to insertion of a video stream into a Matroska container file. In many embodiments, the trick play track is also subject to the further constraint that every frame in the GOP of each Cluster element in the trick play track is encoded as an IDR frame. As with the other video streams, each Cluster element contains a GOP corresponding to the same two seconds of source media as the corresponding Cluster elements in the other streams. There are simply fewer frames in the GOPs of the trick play track and each frame has a longer duration. In this way, transitions to and from a trick play stream can be treated in the same way as transitions between any of the other encoded streams are treated within an adaptive bitrate streaming system in accordance with embodiments of the invention. Playback of the frames contained within the trick play track to achieve accelerated visual search typically involves the playback device manipulating the time-codes assigned to the frames of encoded video prior to providing the frames to the playback device's decoder to achieve a desired increase in rate of accelerated search (e.g. ×2, ×4, ×6, etc.).

Figure 4E:
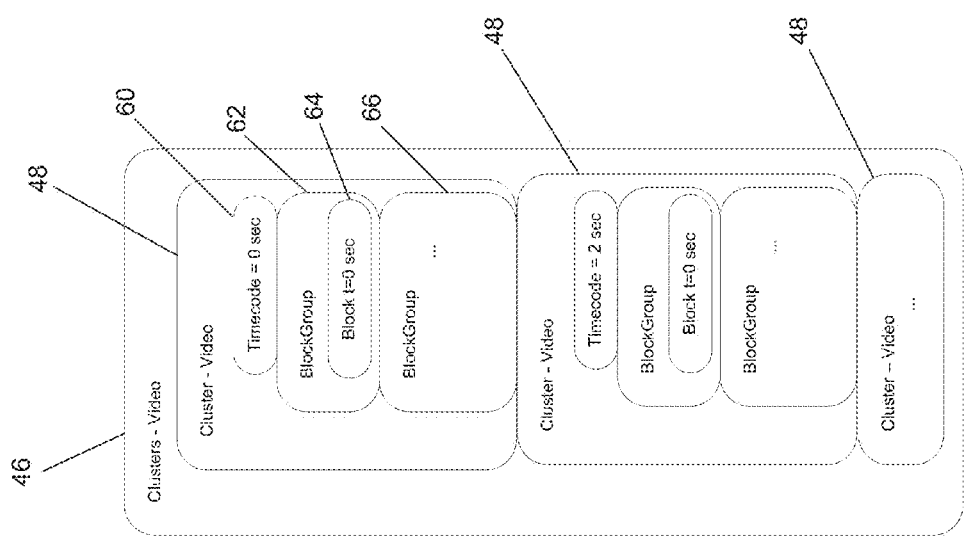
FIG. 4e conceptually illustrates the inclusion of a trick play track into the Clusters element of a Matroska container file subject to various constraints that facilitate adaptive bitrate streaming in accordance with an embodiment of the invention.

A Clusters element containing encoded media from a trick play track is shown in FIG. 4*e*. In the illustrated embodiment, the encoded trick play track is inserted within the Cluster elements 48 subject to the same constraints applied to the encoded video discussed above with respect to FIG. 4*a*. However, each Block element contains an IDR. In other embodiments, the Cluster elements within the container files containing the trick play tracks need not correspond with the start time and duration of the Cluster elements in the container files containing the alternative video streams.

In many embodiments, source content can be encoded to provide a single trick play track or multiple trick play tracks for use by the adaptive bit rate streaming system. When a single trick play track is provided, the trick play track is typically encoded at a low bitrate. When multiple alternative trick play tracks are provided, adaptive rate streaming can also be performed with respect to the trick play tracks. In several embodiments, multiple trick play tracks are provided to support different rates of accelerated visual search through the encoded media.

Incorporating Indexing Information within MKV Container Files

Figure 5:
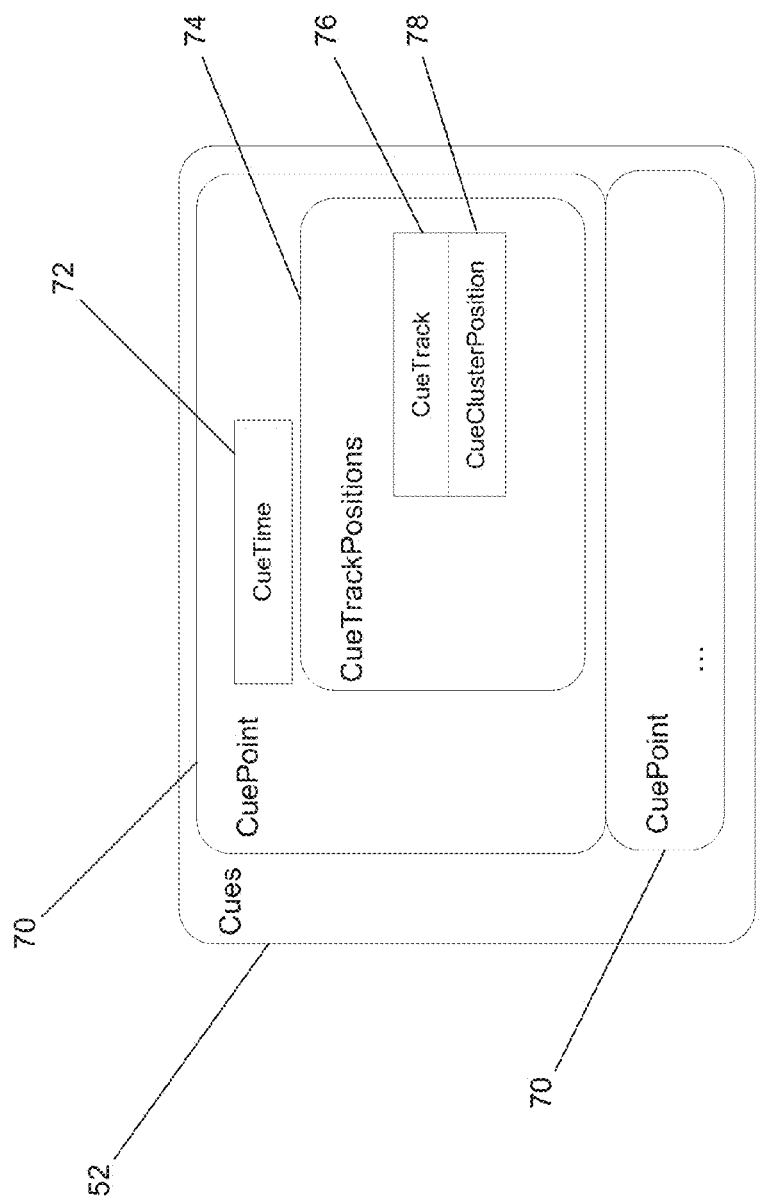
FIG. 5 conceptually illustrates a modified Cues element of a specialized Matroska container file, where the Cues element includes information enabling the retrieval of Cluster elements using HTTP byte range requests in accordance with an embodiment of the invention.

The specification for the Matroska container file format provides for an optional Cues element that is used to index Block elements within the container file. A modified Cues element 52 that can be incorporated into a Matroska container file in accordance with an embodiment of the invention to facilitate the requesting of clusters by a playback device using HTTP is illustrated in FIG. 5. The modified Cues element 52 includes a plurality of CuePoint elements 70 that each includes a CueTime attribute 72. Each CuePoint element includes a CueTrackPositions element 74 containing the CueTrack 76 and CueClusterPosition 78 attributes. In many embodiments, the CuePoint element is mainly configured to identify a specific Cluster element as opposed to a specific Block element within a Cluster element. Although, in several applications the ability to seek to specific BlockGroup elements within a Cluster element is required and additional index information is included in the Cues element.

Figure 6:
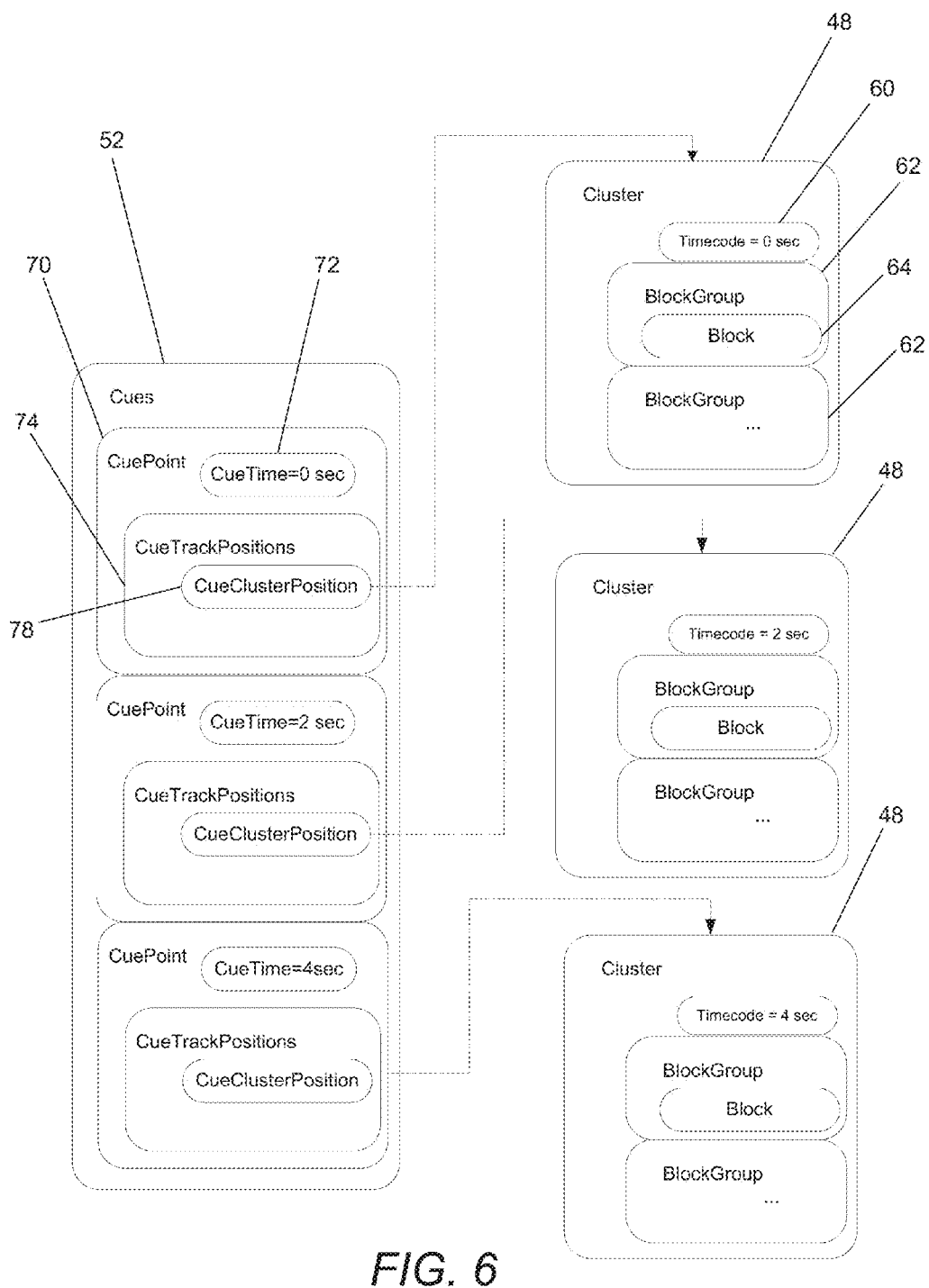
FIG. 6 conceptually illustrates the indexing of Cluster elements within a specialized Matroska container file utilizing modified CuePoint elements within the container file in accordance with embodiments of the invention.

The use of a modified Cues element to index encoded media within a Clusters element of a Matroska file in accordance with an embodiment of the invention is illustrated in FIG. 6. A CuePoint element is generated to correspond to each Cluster element within the Matroska container file. The CueTime attribute 72 of the CuePoint element 70 corresponds to the Timecode attribute 60 of the corresponding Cluster element 48. In addition, the CuePoint element contains a CueTrackPositions element 74 having a CueClusterPosition attribute 78 that points to the start of the corresponding Cluster element 48. The CueTrackPositions element 74 can also include a CueBlockNumber attribute, which is typically used to indicate the Block element containing the first IDR frame within the Cluster element 48.

As can readily be appreciated the modified Cues element 52 forms an index to each of the Cluster elements 48 within the Matroska container file. Furthermore, the CueTrackPosition elements provide information that can be used by a playback device to request the byte range of a specific Cluster element 48 via HTTP or another suitable protocol from a remote server. The Cues element of a conventional Matroska file does not directly provide a playback device with information concerning the number of bytes to request from the start of the Cluster element in order to obtain all of the encoded video contained within the Cluster element. The size of a Cluster element can be inferred in a modified Cues element by using the CueClusterPosition attribute of the CueTrackPositions element that indexes the first byte of the next Cluster element. Alternatively, additional CueTrackPosition elements could be added to modified Cues elements in accordance with embodiments of the invention that index the last byte of the Cluster element (in addition to the CueTrackPositions elements that index the first byte of the Cluster element), and/or a non-standard CueClusterSize attribute that specifies the size of the Cluster element pointed to by the CueClusterPosition attribute is included in each CueTrackPosition element to assist with the retrieval of specific Cluster elements within a Matroska container file via HTTP byte range requests or a similar protocol.

The modification of the Cues element in the manner outlined above significantly simplifies the retrieval of Cluster elements from a Matroska container file via HTTP or a similar protocol during adaptive bitrate streaming. In addition, by only indexing the first frame in each Cluster the size of the index is significantly reduced. Given that the index is typically downloaded prior to playback, the reduced size of the Cues element (i.e. index) means that playback can commence more rapidly. Using the CueClusterPosition elements, a playback device can request a specific Cluster element from the stream most suited to the streaming conditions experienced by the playback device by simply referencing the index of the relevant Matroska container file using the Timecode attribute for the desired Cluster element.

Figure 5A:
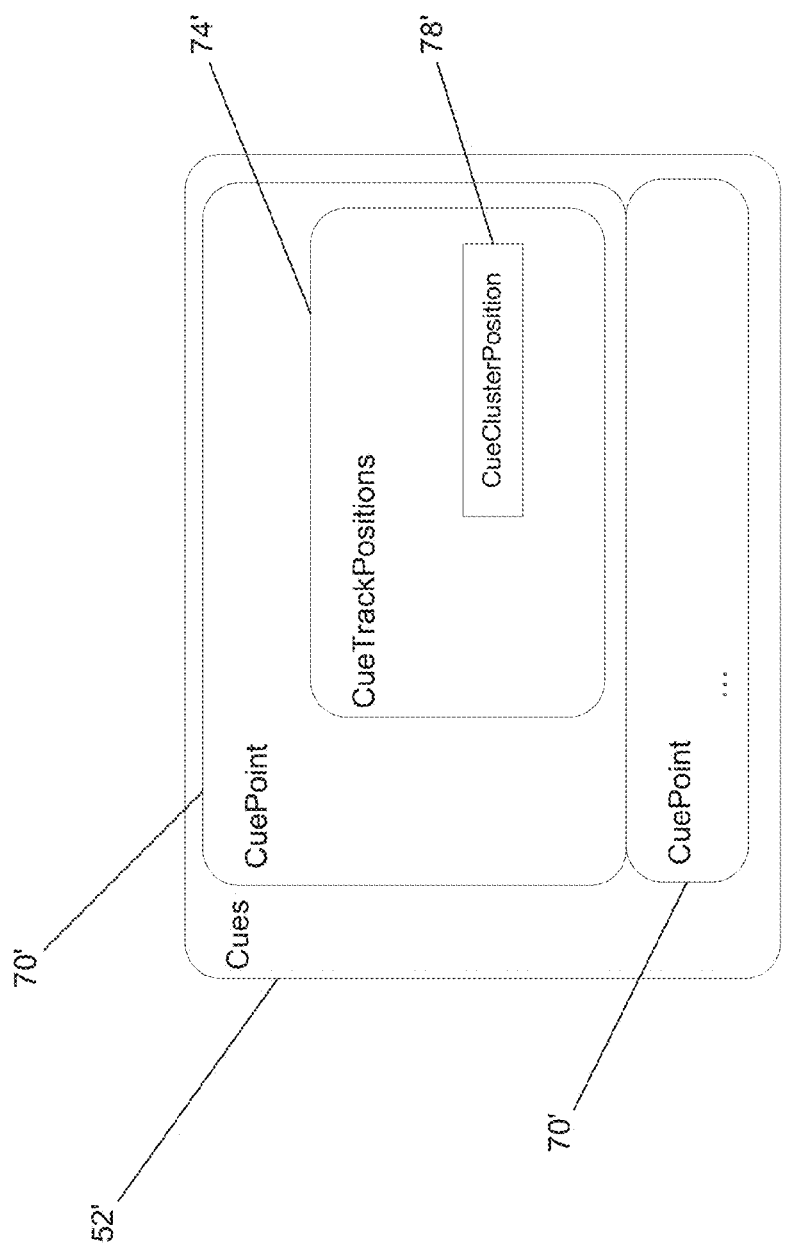
FIG. 5a conceptually illustrates a modified Cues element of a specialized Matroska container file in accordance with an embodiment of the invention, where the Cues element is similar to the Cues element shown in FIG. 5 with the exception that attributes that are not utilized during adaptive bitrate streaming are removed.

In some embodiments, a number of the attributes within the Cues element are not utilized during adaptive bitrate streaming. Therefore, the Cues element can be further modified by removing the unutilized attributes to reduce the overall size of the index for each Matroska container file. A modified Cues element that can be utilized in a Matroska container file that includes a single encoded stream in accordance with an embodiment of the invention is illustrated in FIG. 5a. The Cues element 52' shown in FIG. 5a is similar to the Cues element 52 shown in FIG. 5 with the exception that the CuePoint elements 70' do not include a CueTime attribute (see 72 in FIG. 5) and/or the CueTrackPositions elements 74' do not include a CueTrack attribute (76 in FIG. 5). When the portions of encoded media in each Cluster element in the Matroska container file have the same duration, the CueTime attribute is not necessary. When the Matroska contain file includes a single encoded stream, the CueTrack attribute is not necessary. In other embodiments, the Cues element and/or other elements of the Matroska container file can be modified to remove elements and/or attributes that are not necessary for the adaptive bitrate streaming of the encoded stream contained within the Matroska container file, given the manner in which the stream is encoded and inserted in the Matroska container file.

Although various modifications to the Cues element to include information concerning the size of each of the Cluster elements within a Matroska container file and to eliminate unnecessary attributes are described above, many embodiments of the invention utilize a conventional Matroska container. In several embodiments, the playback device simply determines the size of Cluster elements on the fly using information obtained from a conventional Cues element, and/or relies upon a separate index file containing information concerning the size and/or location of the Cluster elements within the MKV container file. In several embodiments, the additional index information is stored in the top level index file. In a number of embodiments, the additional index information is stored in separate files that are identified in the top level index file. When index information utilized to retrieve Cluster elements from a Matroska container file is stored separately from the container file, the Matroska container file is still typically constrained to encode media for inclusion in the Cluster elements in the manner outlined above. In addition, wherever the index information is located, the index information will typically index each Cluster element and include (but not be limited to) information concerning at least the starting location and, in many instances, the size of each Cluster element.

Encoding Source Media for Adaptive Bitrate Streaming

Figure 7:
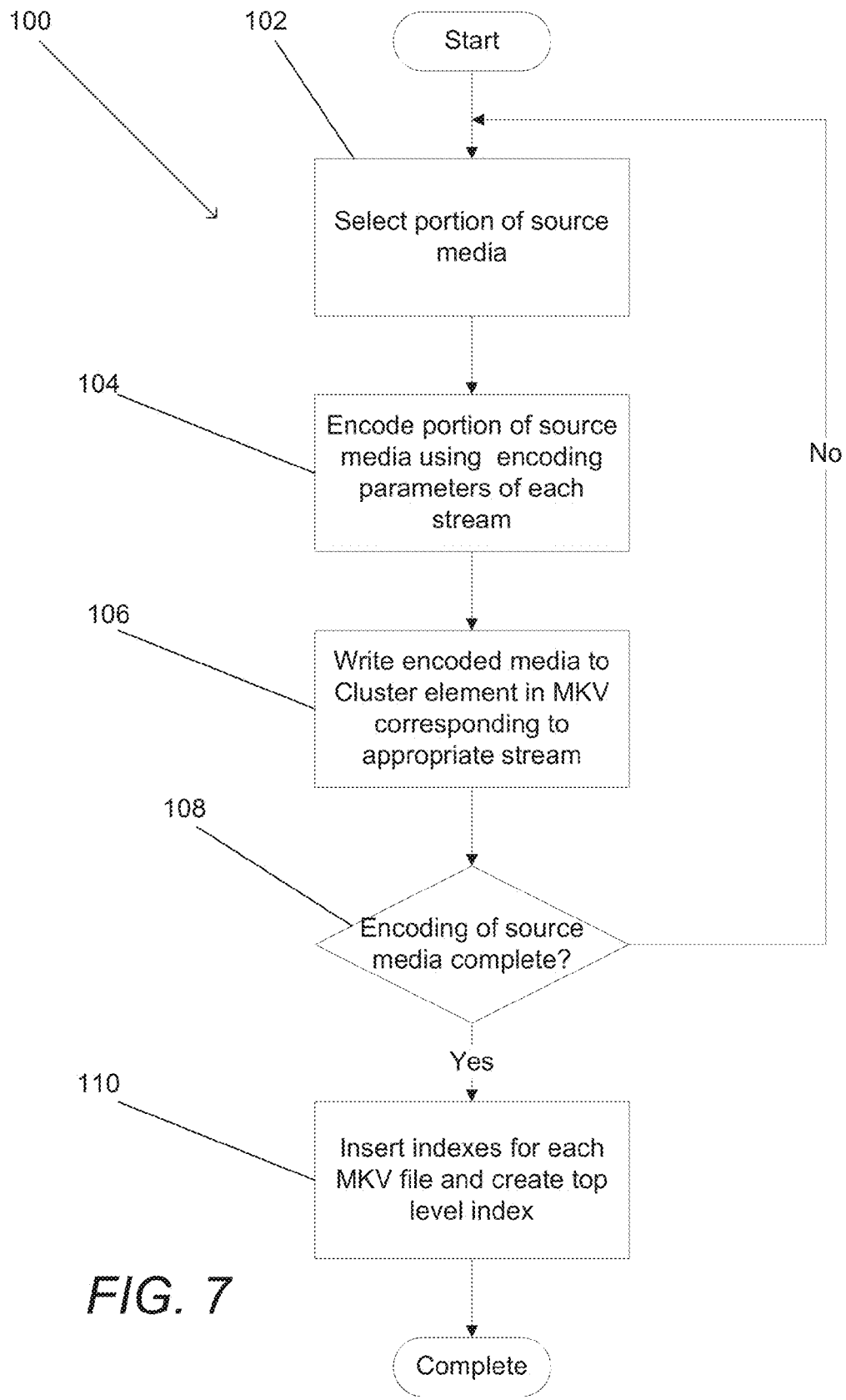
FIG. 7 is a flow chart illustrating a process for encoding source media for adaptive bitrate streaming in accordance with an embodiment of the invention.

A process for encoding source media as a top level index file and a plurality of Matroska container files for use in an adaptive bitrate streaming system in accordance with an embodiment of the invention is illustrated in FIG. 7. The encoding process 100 commences by selecting (102) a first portion of the source media and encoding (104) the source media using the encoding parameters for each stream. When the portion of media is video, then the portion of source video is encoded as a single GOP commencing with an IDR frame. In many embodiments, encoding parameters used to create the alternative GOPs vary based upon bitrate, frame rate, encoding parameters and resolution. In this way, the portion of media is encoded as a set of interchangeable alternatives and a playback device can select the alternative most appropriate to the streaming conditions experienced by the playback device. When different resolutions are supported, the encoding of the streams is constrained so that each stream has the same display aspect ratio. A constant display aspect ratio can be achieved across different resolution streams by varying the sample aspect ratio with the resolution of the stream. In many instances, reducing resolution can result in higher quality video compared with higher resolution video encoded at the same bit rate. In many embodiments, the source media is itself encoded and the encoding process (104) involves transcoding or transrating of the encoded source media according to the encoding parameters of each of the alternative streams supported by the adaptive bitrate streaming system.

Once the source media has been encoded as a set of alternative portions of encoded media, each of the alternative portions of encoded media is inserted (106) into a Cluster element within the Matroska container file corresponding to the stream to which the portion of encoded media belongs. In many embodiments, the encoding process also constructs indexes for each Matroska container file as media is inserted into Cluster elements within the container. Therefore, the process 100 can also include creating a CuePoint element that points to the Cluster element inserted within the Matroska container file. The CuePoint element can be held in a buffer until the source media is completely encoded. Although the above process describes encoding each of the alternative portions of encoded media sequentially in a single pass through the source media, many embodiments of the invention involve performing a separate pass through the source media to encode each of the alternative streams.

Referring back to FIG. 7, the process continues to select (102) and encode (104) portions of the source media and then insert (106) the encoded portions of media into the Matroska container file corresponding to the appropriate stream until the entire source media is encoded for adaptive bitrate streaming (108). At which point, the process can insert an index (110) into the Matroska container for each stream and create (112) a top level index file that indexes each of the encoded streams contained within the Matroska container files. As noted above, the indexes can be created as encoded media and inserted into the Matroska container files so that a CuePoint element indexes each Cluster element within the Matroska container file. Upon completion of the encoding, each of the CuePoint elements can be included in a Cues element and the Cues element can be inserted into the Matroska container file following the Clusters element.

Following the encoding of the source media to create Matroska container files containing each of the streams generated during the encoding process, which can include the generation of trick play streams, and a top level index file that indexes each of the streams within the Matroska container files, the top level index file and the Matroska container files can be uploaded to an HTTP server for adaptive bitrate streaming to playback devices. The adaptive bitrate streaming of media encoded in accordance with embodiments of the invention using HTTP requests is discussed further below.

Adaptive Bitrate Streaming from MKV Container Files Using HTTP

When source media is encoded so that there are alternative streams contained in separate Matroska container files for at least one of video, audio, and subtitle content, adaptive streaming of the media contained within the Matroska container files can be achieved using HTTP requests or a similar stateless data transfer protocol. In many embodiments, a playback device requests the top level index file resident on the server and uses the index information to identify the streams that are available to the playback device. The playback device can then retrieve the indexes for one or more of the Matroska files and can use the indexes to request media from one or more of the streams contained within the Matroska container files using HTTP requests or using a similar stateless protocol. As noted above, many embodiments of the invention implement the indexes for each of the Matroska container files using a modified Cues element. In a number of embodiments, however, the encoded media for each stream is contained within a standard Matroska container file and separate index file(s) can also be provided for each of the container files. Based upon the streaming conditions experienced by the playback device, the playback device can select media from alternative streams encoded at different bitrates. When the media from each of the streams is inserted into the Matroska container file in the manner outlined above, transitions between streams can occur upon the completion of playback of media within a Cluster element. Therefore, the size of the Cluster elements (i.e. the duration of the encoded media within the Cluster elements) is typically chosen so that the playback device is able to respond quickly enough to changing streaming conditions and to instructions from the user that involve utilization of a trick play track. The smaller the Cluster elements (i.e. the smaller the duration of the encoded media within each Cluster element), the higher the overhead associated with requesting each Cluster element. Therefore, a tradeoff exists between the responsiveness of the playback device to changes in streaming conditions and the effective data rate of the adaptive streaming system for a given set of streaming conditions (i.e. the portion of the available bandwidth actually utilized to transmit encoded media). In many embodiments, the size of the Cluster elements is chosen so that each Cluster element contains two seconds of encoded media. In other embodiments, the duration of the encoded media can be greater or less than two seconds and/or the duration of the encoded media can vary from Cluster element to Cluster element.

Figure 8:
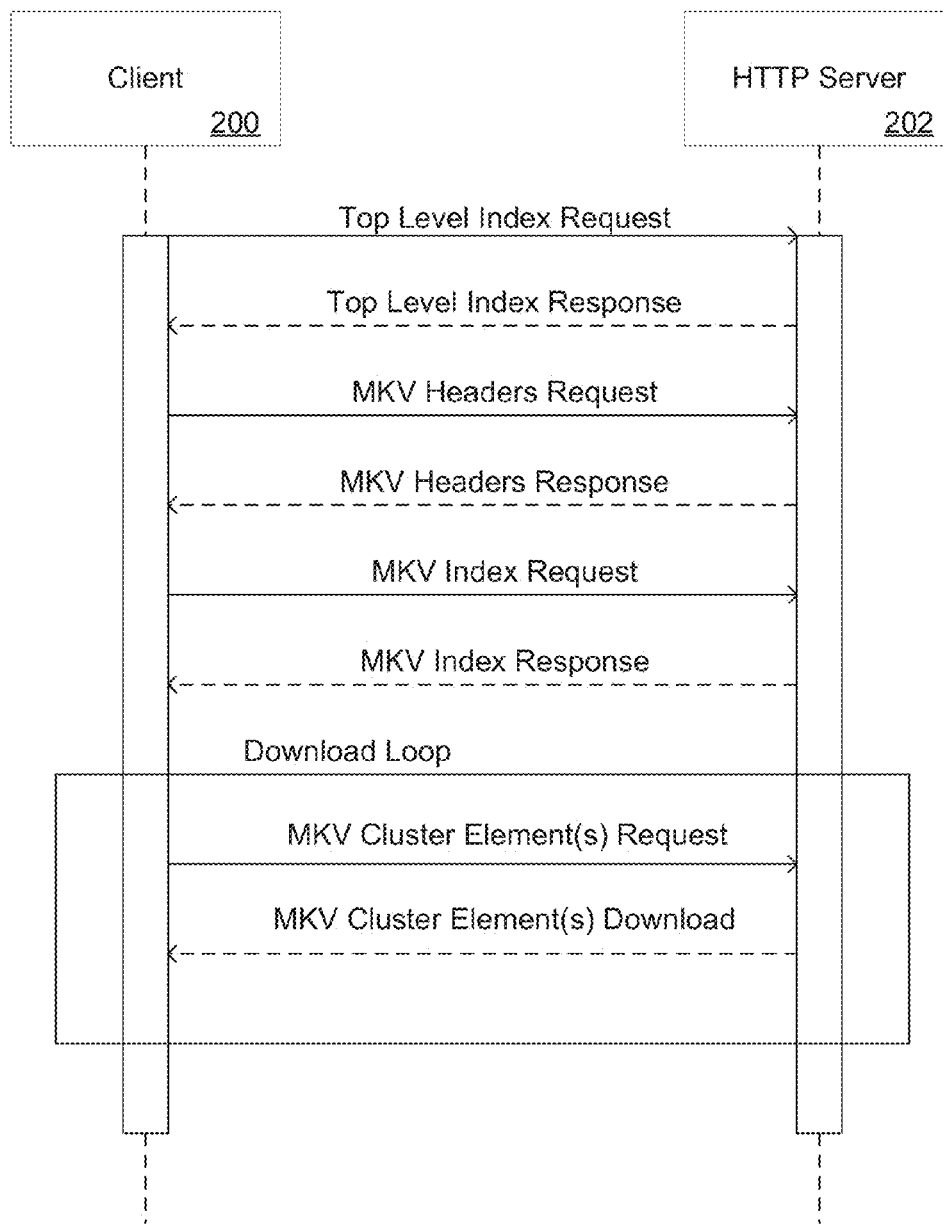
FIG. 8 conceptually illustrates communication between a playback device and an HTTP server associated with the commencement of streaming of encoded media contained within Matroska container files indexed by a top level index file in accordance with an embodiment of the invention.

Communication between a playback device or client and an HTTP server during the playback of media encoded in separate streams contained within Matroska container files indexed by a top level index file in accordance with an embodiment of the invention is illustrated in FIG. 8. In the illustrated embodiment, the playback device 200 commences playback by requesting the top level index file from the server 202 using an HTTP request or a similar protocol for retrieving data. The server 202 provides the bytes corresponding to the request. The playback device 200 then parses the top level index file to identify the URIs of each of the Matroska container files containing the streams of encoded media derived from a specific piece of source media. The playback device can then request the byte ranges corresponding to headers of one or more of the Matroska container files via HTTP or a similar protocol, where the byte ranges are determined using the information contained in the URI for the relevant Matroska container files (see discussion above). The server returns the following information in response to a request for the byte range containing the headers of a Matroska container file:

---
ELEM("EBML")
ELEM("SEEKHEAD")
ELEM("SEGMENTINFO")
ELEM("TRACKS")

---

The EBML element is typically processed by the playback device to ensure that the file version is supported. The SeekHead element is parsed to find the location of the Matroska index elements and the SegmentInfo element contains two key elements utilized in playback: TimecodeScale and Duration. The TimecodeScale specifies the timecode scale for all timecodes within the Segment of the Matroska container file and the Duration specifies the duration of the Segment based upon the TimecodeScale. The Tracks element contains the information used by the playback device to decode the encoded media contained within the Clusters element of the Matroska file. As noted above, adaptive bitrate streaming systems in accordance with embodiments of the invention can support different streams encoded using different encoding parameters including but not limited to frame rate, and resolution. Therefore, the playback device can use the information contained within the Matroska container file's headers to configure the decoder every time a transition is made between encoded streams.

In many embodiments, the playback device does not retrieve the headers for each Matroska container files indexed in the top level index file. Instead, the playback device determines the stream(s) that will be utilized to initially commence playback and requests the headers from the corresponding Matroska container files. Depending upon the structure of the URIs contained within the top level index file, the playback device can either use information from the URIs or information from the headers of the Matroska container files to request byte ranges from the server that contain at least a portion of the index from relevant Matroska container files. The byte ranges can correspond to the entire index. The server provides the relevant byte ranges containing the index information to the playback device, and the playback device can use the index information to request the byte ranges of Cluster elements containing encoded media using this information. When the Cluster elements are received, the playback device can extract encoded media from the Block elements within the Cluster element, and can decode and playback the media within the Block elements in accordance with their associated Timecode attributes.

In the illustrated embodiment, the playback device 200 requests sufficient index information from the HTTP server prior to the commencement of playback that the playback device can stream the entirety of each of the selected streams using the index information. In other embodiments, the playback device continuously retrieves index information as media is played back. In several embodiments, all of the index information for the lowest bitrate steam is requested prior to playback so that the index information for the lowest bitrate stream is available to the playback device in the event that streaming conditions deteriorate rapidly during playback.

Switching Between Streams

The communications illustrated in FIG. 8 assume that the playback device continues to request media from the same streams (i.e. Matroska container files) throughout playback of the media. In reality, the streaming conditions experienced by the playback device are likely to change during the playback of the streaming media and the playback device can request media from alternative streams (i.e. different Matroska container files) to provide the best picture quality for the streaming conditions experienced by the playback device. In addition, the playback device may switch streams in order to perform a trick play function that utilizes a trick play track stream.

Figure 9A:
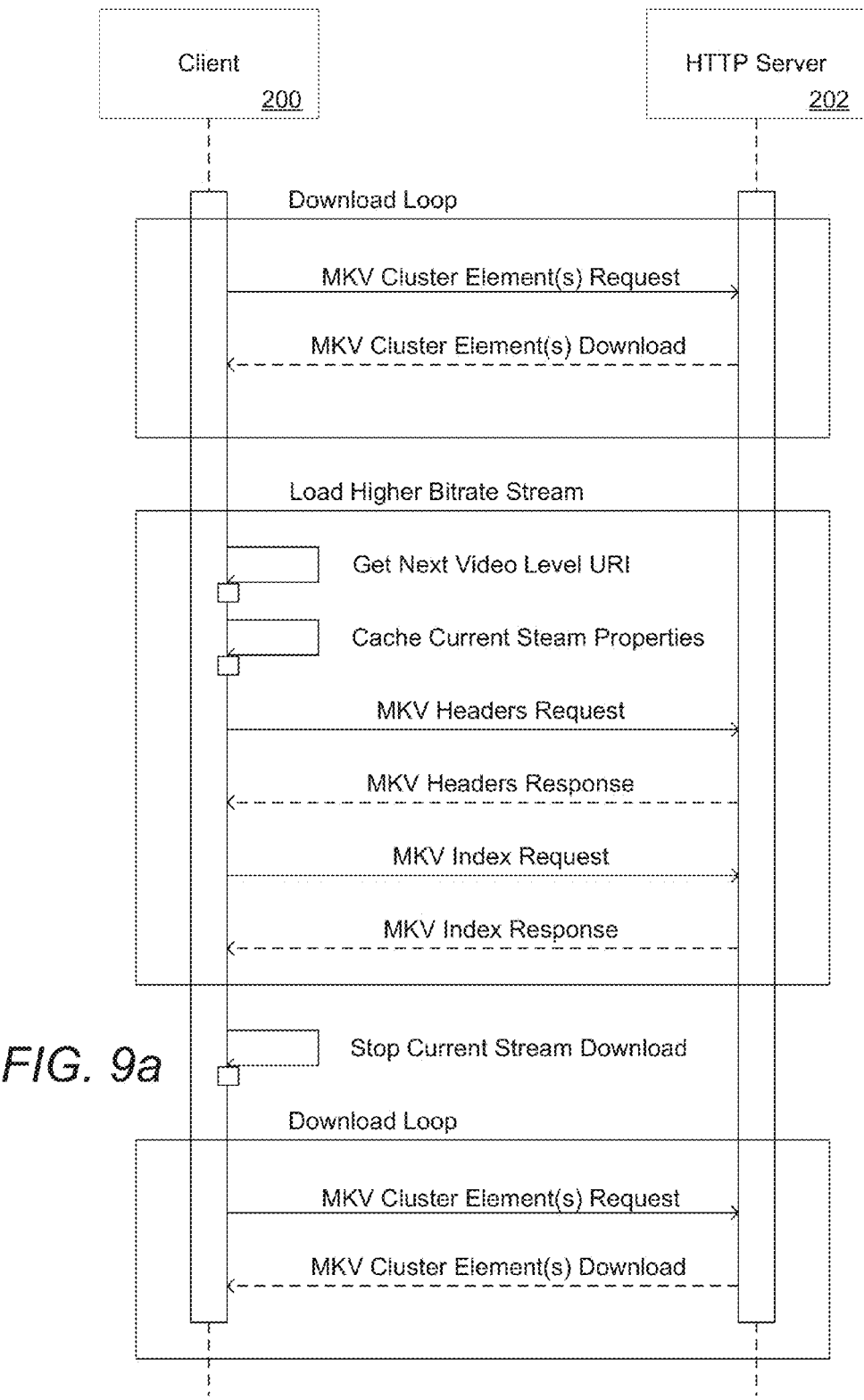
FIGS. 9a and 9b conceptually illustrate communication between a playback device and an HTTP server associated with switching between streams in response to the streaming conditions experienced by the playback device and depending upon the index information available to the playback device prior to the decision to switch streams in accordance with embodiments of the invention.

Communication between a playback device and a server when a playback device switches to a new stream in accordance with embodiments of the invention are illustrated in FIG. 9a. The communications illustrated in FIG. 9a assume that the index information for the new stream has not been previously requested by the playback device and that downloading of Cluster elements from the old stream proceeds while information is obtained concerning the Matroska container file containing the new stream. When the playback device 200 detects a change in streaming conditions, determines that a higher bitrate stream can be utilized at the present streaming conditions, or receives a trick play instruction from a user, the playback device can use the top level index file to identify the URI for a more appropriate alternative stream to at least one of the video, audio, or subtitle streams from which the playback device is currently requesting encoded media. The playback device can save the information concerning the current stream(s) and can request the byte ranges of the headers for the Matroska container file(s) containing the new stream(s) using the parameters of the corresponding URIs. Caching the information in this way can be beneficial when the playback device attempts to adapt the bitrate of the stream downward. When the playback device experiences a reduction in available bandwidth, the playback device ideally will quickly switch to a lower bitrate stream. Due to the reduced bandwidth experienced by the playback device, the playback device is unlikely to have additional bandwidth to request header and index information. Ideally, the playback device utilizes all available bandwidth to download already requested higher rate Cluster elements and uses locally cached index information to start requesting Cluster elements from Matroska container file(s) containing lower bitrate stream(s).

Byte ranges for index information for the Matroska container file(s) containing the new stream(s) can be requested from the HTTP server 202 in a manner similar to that outlined above with respect to FIG. 8. At which point, the playback device can stop downloading of cluster elements from the previous streams and can commence requesting the byte ranges of the appropriate Cluster elements from the Matroska container file(s) containing the new stream(s) from the HTTP server, using the index information from the Matroska container file(s) to identify the Cluster element(s) containing the encoded media following the encoded media in the last Cluster element retrieved by the playback device. As noted above, the smooth transition from one stream to another is facilitated by encoding each of the alternative streams so that corresponding Cluster elements start with the same Timecode element and an IDR frame.

Figure 9B:
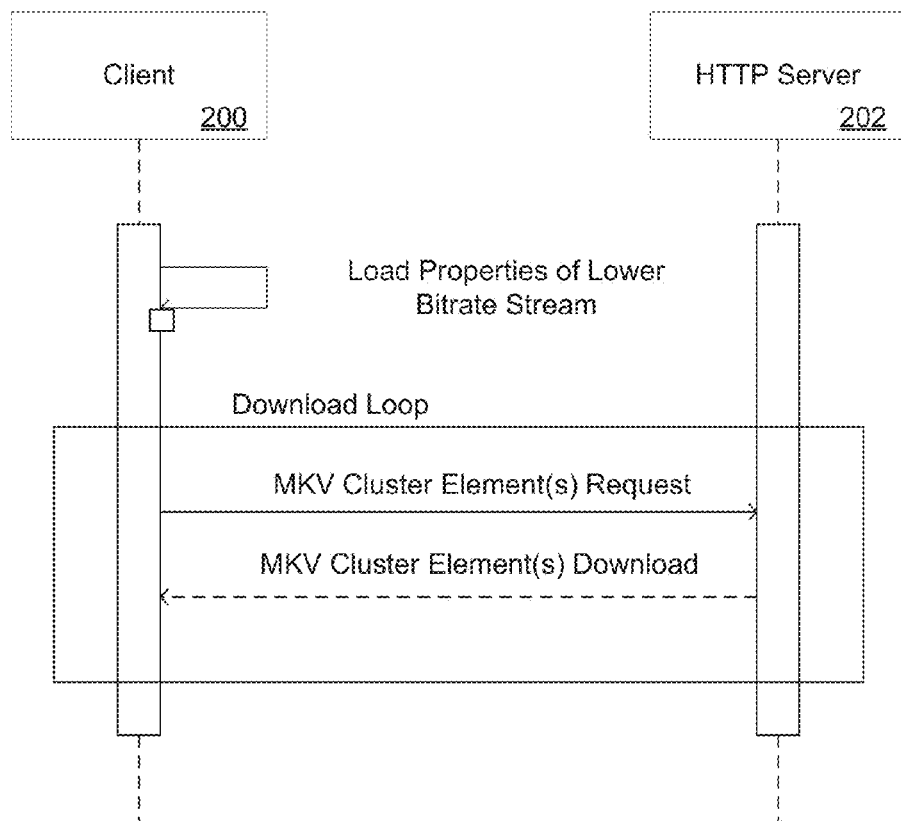

When the playback device caches the header and the entire index for each stream that has be utilized in the playback of the media, the process of switching back to a previously used stream can be simplified. The playback device already has the header and index information for the Matroska file containing the previously utilized stream and the playback device can simply use this information to start requesting Cluster elements from the Matroska container file of the previously utilized stream via HTTP. Communication between a playback device and an HTTP server when switching back to a stream(s) for which the playback device has cached header and index information in accordance with an embodiment of the invention is illustrated in FIG. 9b. The process illustrated in FIG. 9b is ideally performed when adapting bitrate downwards, because a reduction in available resources can be exacerbated by a need to download index information in addition to media. The likelihood of interruption to playback is reduced by increasing the speed with which the playback device can switch between streams and reducing the amount of overhead data downloaded to achieve the switch.

Downloading Streamed Media

In many embodiments, a playback device can save downloaded portions of streamed media to build a complete copy of the source media from streams having desired bitrates. In several embodiments, the playback device performs adaptive bitrate streaming of portions of audio, video and/or subtitle streams. Depending upon the streaming conditions, the portions of the audio, video and/or subtitle streams requested by the playback device may vary. When the individual streams are at a desired bitrate, the playback device can save the portion of the stream that has been downloaded. Independently of the streaming session, the playback device can determine the portions of the streams that were not streamed at the desired bitrate and can attempt to obtain those portions asynchronously. In several embodiments, the playback device can request the portions that were not streamed when the network conditions support streaming of media at the highest bitrate capable of being played back by the playback device. In a number of embodiments, the playback device can request the portions that were not streamed when the network conditions support streaming at the bitrate of the stream(s) selected for downloading by the playback device. In this mode, when sufficient bandwidth is available, the download streams can download faster than they are streamed. Therefore, the playback device can switch from playing back streamed encoded media and can commence playback from the downloaded streams. In the event that the available bandwidth drops, playback continues at high quality until the limit of the downloaded streams is reached. In effect, the playback device plays back media in this mode as if the size of the buffer of the playback device is infinite. Accordingly, the playback device need to not be concerned with limiting the amount of content requested to avoid buffer overflow. The remainder (if any) of the downloaded streams can be downloaded by the playback device after the streaming session is completed by requesting the remaining portions of each stream from the remote server and/or via a peer-to-peer network. When each stream is completely downloaded, the playback device can multiplex the streams into one or more container files. In several embodiments, a local top level index file can be generated that can be utilized to playback the saved streams as an alternative to multiplexing the streams into a container file.

In many embodiments, additional streams and/or information are also requested by the playback device. The playback device can identify additional streams that can be downloaded using top level index data utilized by the playback device to adaptively stream the encoded media. Additional streams include but are not limited to one or more additional streams from the alternative video streams, one or more alternative audio streams, one or more a subtitle streams, and/or one or more trick play streams. The additional streams and information can also be multiplexed into the container file. Where the encoded media includes trick play streams, the down-loading of the trick play stream can significantly speed the responsiveness of the playback device to requests to perform visual search of the encoded media. Therefore, the playback device can prioritize the downloading of the trick play streams prior to downloading other portions of the downloaded streams. Where an additional stream is a second stream from set of the alternative streams of video data, the playback device can save streamed portions of video data from the second stream and separately download remaining data in a similar manner to that in which data is saved and separately downloaded from a single stream of video data.

Figure 10:
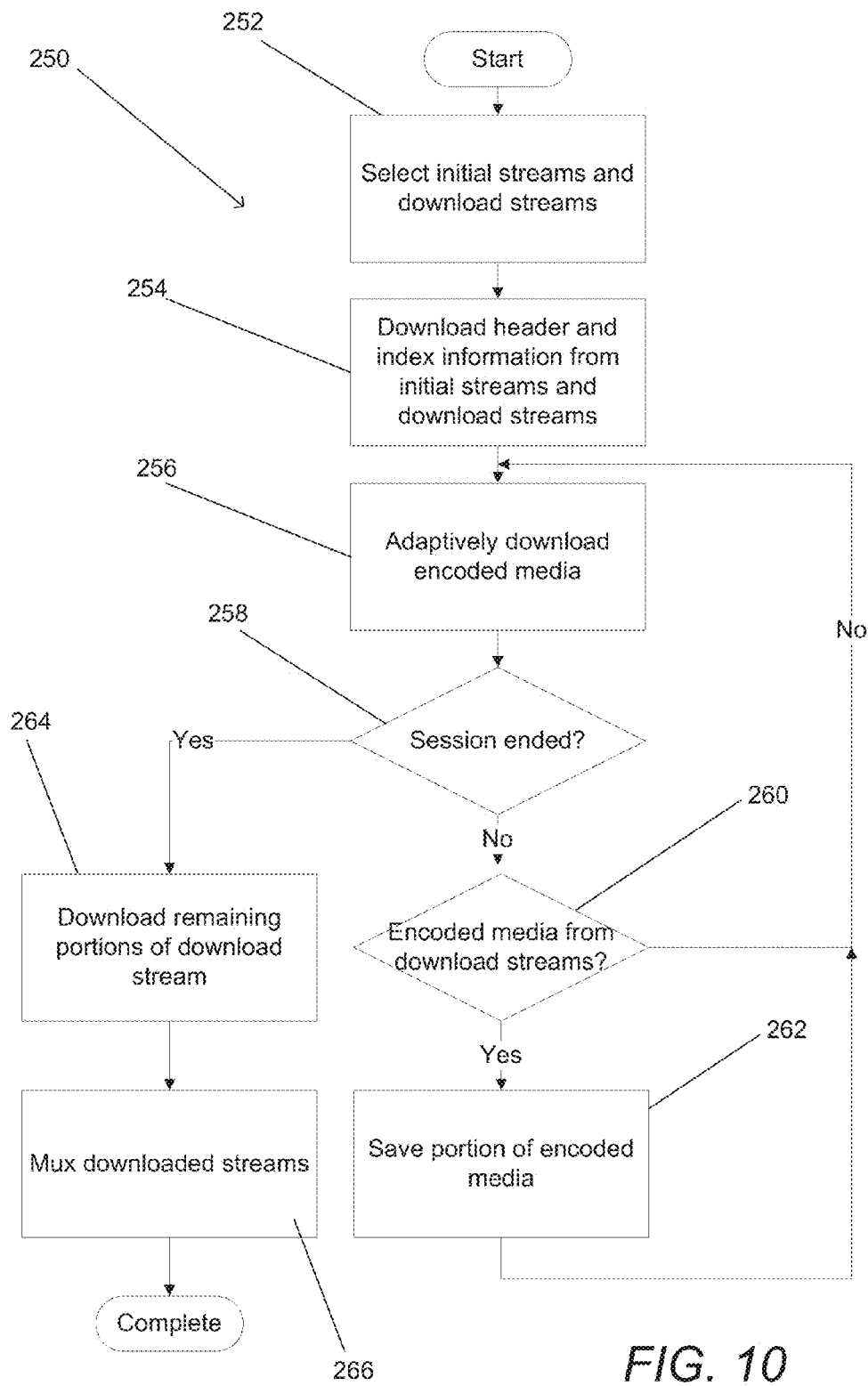
FIG. 10 is a flow chart illustrating a process for saving specific streams of encoded media during the adaptive streaming of encoded media in accordance with embodiments of the invention.

A process for downloading streams of encoded media from a remote server in accordance with an embodiment of the invention is illustrated in FIG. 10. The process 250 includes selecting (252) initial streams and download streams. The initials streams are the streams that are used to commence the adaptive bitrate streaming of the encoded media and the download streams are the streams that are downloaded to create a local copy of the encoded media on the playback device. Where there are alternative streams available, typically, the initial streams are at a lower bitrate than the download streams unless the playback device is able to probe the network streaming conditions to ascertain that sufficient network bandwidth is available to support streaming of the download streams. Header and index information is downloaded (254) for the initial streams and (optionally) for the download streams. The adaptive streaming of the encoded media then commences (258) starting with the playback device requesting portions of encoded media from the initial streams and adapting to one or more alternative streams according to the streaming conditions. As encoded media is downloaded, the playback device determines (260) whether the portions of media received by the playback device are from the download streams. Portions of encoded media that are from any of the download streams are saved (262) by the playback device, otherwise the portions of encoded media are discarded following playback. When the streaming session completes (258), the remaining portions of the download stream are downloaded (264) by the playback device. The remaining portions of the download stream can be downloaded directly from the server or via a peer-to-peer network. Once each of the down-load streams is completely downloaded by the playback device, the playback device can multiplex the streams into a single container file that can be locally saved by the playback device and/or shared with other devices. In embodiments where one or more of the streams are encrypted, the playback device can include digital rights management (DRM) information into the container file to enable playback of the encrypted media. In a number of embodiments, the playback device requests a digital rights management header to insert into the container file from a digital rights management server and the digital rights management header binds the content to a specific device and/or user account. System and methods for playing DRM-protected media are disclosed in U.S. patent application Ser. No. 13/340,623, entitled "Systems and Methods for Playing Back Alternative Streams of Protected Content Protected Using Common Cryptographic Information" the entirety of which is incorporated by reference. Systems and methods for issuing and embedding DRM information in downloaded files are disclosed in U.S. patent application Ser. No. 13/436,917 to Ziskind et al. filed Mar. 31, 2012, entitled "Systems and Methods for Granting Access to Digital Content Using Electronic Tickets and Ticket Tokens", the entirety of which is incorporated herein by reference.

In several embodiments, the source media is encoded in streams stored on one or more remote servers in Matroska container files in the manner outlined above. In order to request encoded media from a stream, the playback device typically uses top level index data to down-load the headers and index from the container file containing the stream. The playback device can save the headers and index of the down-load streams into local container files and save portions of encoded media from the download streams in the local container files as they are received by the playback device. During the streaming of the encoded media, Cluster elements from the download streams can be written to the local container files. When a received Cluster element is not from a download stream, the playback device can leave a gap in the corresponding container file. In a number of embodiments, the playback device determines the size of the gap using the stored index for the download stream to calculate the size of the corresponding Cluster element from the download stream. In this way, the Cluster elements that were not downloaded during the streaming of the encoded media can be written to the container file. Once all of the Cluster elements have been downloaded, the playback device can multiplex the encoded media stored in each of the separate container files into a single container file. In many embodiments, the download streams are identified in top level index data obtained by the playback device. In several embodiments, the top level index data is automatically generated based upon the capabilities of the playback device and the permissions that the playback device has with respect to saving the encoded media.

Specific processes are described above the downloading and saving of encoded media that is adaptively streamed to a playback device; however, any of a variety of techniques can be utilized to save portions of adaptively streamed media to build a copy of source media in accordance with embodiments of the invention.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive. Accordingly, the scope of the invention should be determined not by the embodiments illustrated, but by the appended claims and their equivalents.

What is claimed is:

1. A playback device configured to perform adaptive bitrate streaming of media including a set of alternative streams of video data, comprising:
    memory including a video decoder application;
    a processor, where the video decoder application configures the processor to:
        measure streaming conditions between the playback device and a content provider and request each portion of the video data from one of a set of alternative streams of the video data based upon the measured streaming conditions wherein each of the alternate streams of data in the set of alternative streams is encoded at a different maximum bitrate;
        receive each of the portions of video data from the requested one of the set of alternative streams of video data;
        determine whether each portion of the video data was downloaded from a stream having at least a desired maximum bitrate;
        save each portion of video data that is determined to have been downloaded from a stream having at least the desired maximum bitrate to memory;
        decode the received portions of video data; and
        separately download and save a replacement portion of video data from a stream from the set of alternative streams having at least the desired maximum bit rate for each portion of video data that is determined not be downloaded at least at the desired maximum bit rate to memory.

2. The playback device of claim 1, wherein the video decoder application configures the processor to separately download and save each replacement portion of video data for each portion of video data that is determined not be downloaded at least at the desired maximum bit rate after streaming of video data from the alternative streams of video data has ceased.

3. The playback device of claim 1, wherein the video decoder application configures the processor to separately download and save each replacement portion of the video data for each portion of video data that is determined not be downloaded at least at the desired maximum bit rate during the streaming of video data from the alternative streams of video data.

4. The playback device of claim 1, wherein the video decoder application configures the processor to select multiple download streams for each portion of video data from the set of alternative streams of video data.

5. The playback device of claim 1, wherein the media further includes a set of additional streams of data and where the video decoder application further configures the processor to select at least one additional download stream from the set of additional streams of data.

6. The playback device of claim 5, wherein the video decoder application configures the processor to request a selected additional stream of data and to save the stream of data to memory.

7. The playback device of claim 5, wherein the client application configures the processor to separately download data from a selected additional stream.

8. The playback device of claim 1, wherein the additional streams of data are from the group consisting of an alternative audio stream, a subtitle stream, a trick play stream, and an additional alternative video stream.

9. The playback device of claim 1, wherein the video decoder application further configures the processor to multiplex the stored portions and replacement portions of video data into a container file.

10. The playback device of claim 9, wherein the container file is in the Extensible Binary Meta Language file format.

11. The playback device of claim 9, wherein the container file is a Matroska container file.

12. The playback device of claim 9, wherein the video decoder application further configures the processor to:
    request header information and index information from the content provider; and
    generate header and index information for the container file using information including the requested header and index information received from the content provider.

13. The playback device of claim 12, wherein:
    the portions and replacement portions of video data are encrypted; and
    the video decoder application further configures the processor to include cryptographic information in the header of the container file that enables playback of the encrypted video data.

14. The playback device of claim 13, wherein the cryptographic information is unique to the playback device.

15. The playback device of claim 13, wherein the cryptographic information is unique to a specific user.

16. An adaptive streaming system, comprising:
    a media server, where the media server stores media including a set of alternative streams of video data;
    a playback device in communication with the media server, where the playback device is configured to:
        request media from the media server;
        measure streaming conditions and request each portion of the video data from one of the set of alternative streams of video data based upon the measured streaming conditions wherein each of the alternate streams in the set of alternate streams of video data is encoded at a different maximum bitrate;
        receive each of the portions of video data from the requested of the alternative streams stream of video data;
        determine whether each of the portions of the video data is from one of the alternative streams that has at least a predetermined maximum bitrate
        save the received each portion of the video data determined to be from one of the alternative streams having at least the predetermined maximum bitrate to memory;
        decode each of the received portions of video data using a video decoder; and
        separately download and save a replacement portion of video from one of the set of alternative streams having at least the predetermined maximum bitrate for each portion of video data determined not to be from one of the alternative streams having at least the predetermined maximum bitrate.

17. The adaptive streaming system of claim 16, wherein the playback device is configured to separately download and save each replacement portion for each portion of video data determined not to be from one of the alternative streams having at least the predetermined maximum bitrate from the media server.

18. The adaptive streaming system of claim 16, wherein the playback device is configured to separately download and save each replacement portion for each portion of video data determined not to be from one of the alternative streams having at least the predetermined maximum bitrate from at least one peer playback device via a peer-to-peer network.

19. A method of performing adaptive bitrate streaming of media using a playback device, comprising:
   measuring streaming conditions between the playback device and a content provider and requesting each portion of the video data from one of a set of alternative streams of video data based upon the measured streaming conditions using the playback device wherein each of the alternate streams of video data is encoded with a different maximum bitrate;
   receiving each of the portions of video data from the requested one of the alternate streams of video data using the playback device;
   decoding the received portions of the video data using the playback device;
   determine whether each portion of the video data was downloaded from a stream having at least a desired maximum bitrate;
   saving each portion of the video data determined to be downloaded from a stream with at least the desired maximum bitrate to memory using the playback device; and
   separately downloading and saving a replacement portion of video from one of the set of alternative streams having at least the predetermined maximum bitrate for each portion of video data determined not to be downloaded from a stream with at least the desired maximum bitrate to memory using the playback device, when the received video data is not from the download stream.

20. The method of claim 19, wherein separately downloading and saving each replacement portion of video for each portion of video data determined to be downloaded from a stream with at least the desired maximum bitrate occurs after streaming of video data from the alternative streams of video data has ceased.

21. The method of claim 19, wherein separately downloading and saving each replacement portion of video data for each portion of video data occurs during the streaming of video data from the alternative streams of video data.

22. The method of claim 19, wherein the media further includes a set of additional streams of data and the method further comprises selecting at least one additional stream of data from the set of additional streams of data to download using the playback device.

23. The method of claim 22, further comprising requesting a selected additional stream of data and saving the stream of data to memory.

24. The method of claim 22, further comprising separately downloading a selected additional stream.

25. The method of claim 22, wherein the additional streams of data are selected from the group consisting of alternative audio track data, subtitle data, trick play track data and alternative video data.

26. The method of claim 19, further comprising multiplexing the portions and replacement portions of video data into a container file using the playback device.

27. The method of claim 26, where the container file is in the Extensible Binary Meta Language file format.

28. The method of claim 26, where the container file is a Matroska container.

29. The method of claim 26, further comprising:
   requesting header information and index information from the content provider using the playback device; and
   generating header and index information for the container file based upon information including the requested header and index information received from the content provider using the playback device.

30. The method of claim 26, wherein:
   the portions and replacement portions of the video data are encrypted; and
   the method further comprises including cryptographic information in the header of the container file using the playback device, where the cryptographic information enables playback of the encrypted video data.

31. The method of claim 30, wherein the cryptographic information is unique to the playback device.

32. The method of claim 30, wherein the cryptographic information is unique to a specific user.

33. A non-transitory machine readable medium containing processor instructions, where execution of the instructions by a processor causes the processor to perform a process comprising:
   measuring streaming conditions between the playback device and a content provider and requesting each portion of the video data from one of a set of alternative streams of video data based upon the measured streaming conditions using the playback device wherein each of the alternate streams of video data is encoded with a different maximum bitrate;
   receiving each of the portions of video data from the requested one of the alternate streams of video data using the playback device;
   decoding the received portions of the video data using the playback device;
   determine whether each portion of the video data was downloaded from a stream having at least a desired maximum bitrate;
   saving each portion of the video data determined to be downloaded from a stream with at least the desired maximum bitrate to memory using the playback device; and
   separately downloading and saving a replacement portion of video from one of the set of alternative streams having at least the predetermined maximum bitrate for each portion of video data determined not to be downloaded from a stream with at least the desired maximum bitrate to memory using the playback device, when the received video data is not from the download stream.

* * * * *